United States Patent
Lu et al.

(10) Patent No.: US 10,089,963 B2
(45) Date of Patent: Oct. 2, 2018

(54) SCREEN ADAPTATION METHOD AND APPARATUS

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 77 days.

(21) Appl. No.: 15/122,647

(22) PCT Filed: Mar. 2, 2015

(86) PCT No.: PCT/CN2015/073471
§ 371 (c)(1),
(2) Date: Aug. 31, 2016

(87) PCT Pub. No.: WO2015/131787
PCT Pub. Date: Sep. 11, 2015

(65) Prior Publication Data
US 2017/0069297 A1   Mar. 9, 2017

(30) Foreign Application Priority Data
Mar. 4, 2014   (CN) .......................... 2014 1 0077059

(51) Int. Cl.
G09G 5/32   (2006.01)
G09G 5/00   (2006.01)
G06F 3/14   (2006.01)

(52) U.S. Cl.
CPC ............. G09G 5/32 (2013.01); G06F 3/1454 (2013.01); G06F 3/1462 (2013.01); G09G 5/00 (2013.01); G09G 2340/0407 (2013.01); G09G 2340/0464 (2013.01); G09G 2340/0492 (2013.01); G09G 2354/00 (2013.01); G09G 2370/022 (2013.01); G09G 2370/10 (2013.01)

(58) Field of Classification Search
None
See application file for complete search history.

(56) References Cited

U.S. PATENT DOCUMENTS

2012/0154297 A1   6/2012   Schultz et al.
2013/0021377 A1*  1/2013   Doll ........................ G09G 5/14
                                                              345/649

* cited by examiner

*Primary Examiner* — Xiao Wu
*Assistant Examiner* — Mohammad H Akhavannik
(74) *Attorney, Agent, or Firm* — Hammer & Associates, P.C.

(57) ABSTRACT

A screen adaptation method and apparatus. A client obtains a user interface data package from a server end and parses the user interface data packet to obtaining drawing information about each module and component; the modules of the user interface are arranged vertically and each module contains one or more components. According to the screen direction of the device where the client is located, the client acquires the display attributes of each component, and draws each component in the user interface according to said attributes and to a resource file required to be filled into each component.

19 Claims, 10 Drawing Sheets

...continued from previous page

Step 101, the client initiates, obtains a UI data packet from the server, parses the UI packet, obtains drawing information of respective modules in the UI and drawing information of the respective components.

Step102, the client obtains attribution information of the device.

Step 103, the client determines whether the device is preset type device, if yes, execute Step 104; if no, execute Step 121.

Step 104, the client selects the module on the top of UI as the current module, sets the display width of the current module as screen width of the device, sets the display coordinates of the current module as left top corner of the device screen.

Step 105, the client obtains the display height of the current module according to the drawing information and display width of the current module.

Step 106, the client selects a component, which is not drawn, as the current component, obtains the display width, display height and display coordinates of the current component according to the display width, display height and the drawing information of the current component.

Step 107, the client determines whether a picture is required to be filled in the current component, if yes, execute Step 109; otherwise, execute Step 108.

Step108, the client obtains resource file of the current component required to be filled in the current component according to the content of the current component; draws the current component according to the obtained resource file, the display width, display height and display coordinates of the current component.

Step 109, the client determines whether screen density of the device is more than a preset density value, if yes, execute Step 110; otherwise, execute Step 114.

Step 110, the client obtains a corresponding high resolution picture according to content of the current component.

Step 111, the client determines whether other resource files required to be filled in the current component except for the picture, if yes, execute Step 113; otherwise, execute Step 112.

Step 112, the client draws the current component according to the obtained high resolution picture, the display width, display height and display coordinates of the current component; execute Step 118.

Step 113, the client obtains other resourc e files according to the content of the current component except for the picture, draws the current component according to the display width, display height and display coordinates of the current component, the obtained high resolution picture and other resource files except for the picture; execute Step 118.

Step 114, the client obtains a corresponding low resolution picture according to the content of the current component.

Step 115, the client determines whether other resource files are required to be filled in the current component except for the current component, if yes, execute Step 117; otherwise, execute Step 116.

Step 116, the client draws the current component according to the obtained low resolution picture, the display width, display height and display coordinates of the current component; execute Step 118.

Step 117, the client obtains other resource files except for the picture according to the content of the current component, draws the current component according to the display width, display height and display coordinates of the current component, the obtained low resolution picture and other resource files except for the picture; execute Step 118.

Step 118, the client determines whether the current module includes the component, which is not drawn, if yes, go back to Step 106; otherwise, execute Step 119.

Step 119, the client determines whether UI includes the unprocessed module, if yes, execute Step 120; otherwise, execute Step 139.

Step 120, the client obtains a result of adding the display ordinate of the current module to the display height of the current module, selects a module, which is adjacent to the current module and located below the current module, as a updated current module in the UI, sets the display ordinate of the updated current module to be the result, sets the display abscissa of the updated current module to be zero, sets the display width of the updated current module to be the screen width of the device, go back to Step 105.

Step 121, the client determines orientation of the device, if the screen orientation is portrait screen, go back to Step 104; if the screen orientation is landscape screen, execute Step 122.

Step 122, the client selects the module on the top of the UI, sets the display width of the current module to be screen height of the device and sets the display coordinates of the current module to be left top corner of the device

FIG. 1 (continued)

continued on next page...

...continued from previous page
screen.

Step 123, the client obtains the display height of the current module according to the drawing information and the display width of the current module.

Step 124, the client selects a component, which is not drawn, as the current component from the current module, obtains the display width, display height and display coordinates of the current component according to the display width and display height of the current module and the drawing information of the current component.

Step 125, the client determines whether requires to fill a picture in the current component, if yes, execute Step 127; otherwise, execute Step 126.

Step 126, the client obtains a resource file required to be filled in the current component according to the content of the current component, draws the current component according to the obtained resource file, the display width, display height and display coordinates of the current component; execute Step 136.

Step 127, the client determines whether the screen density of the device is more than a preset density value, if yes, execute Step 128; otherwise, execute Step 132.

Step 128, the client obtains a corresponding high resolution picture according to the content of the current component.

Step 129, the client determines whether other resource files are required to be filled in the current component except for the picture, if yes, execute Step 131; otherwise, execute Step 130.

Step 130, the client draws the current component according to the obtained high resolution picture, the display width, display height and display coordinates of the current component; execute Step 136.

Step 131, the client obtains other resource file except for the picture according to the content of the current component, draws the current component according to the display width, display height and display coordinates of the current component, the obtained high resolution picture and other resource files except for the picture; execute Step 136.

Step 132, the client obtains a corresponding low resolution picture according to the content of the current component.

Step 133, the client determines whether other resource files except for the picture are required to be filled in the current component, if yes, execute Step 135; otherwise, execute Step 134.

Step 134, the client draws the current component according to the obtained low resolution picture, the display width, display height and display coordinates of the current component; execute Step 136.

Step 135, the clients obtains other resource files except for the picture according to the content of the current component, draws the current component according to the display width, display height and display coordinates of the current component, the obtained low resolution picture and other resource files except for the picture; execute Step 136.

Step 136, the client determines whether the current module includes a component, which is not drawn, if yes, execute Step 124; otherwise, execute Step 137.

Step 137, the client determines whether UI includes an unprocessed module, if yes, execute Step 138; otherwise, execute Step 139.

Step 138, the client obtains a result of adding the display ordinate of the current module to the display height of the current module, select a module, which is adjacent to the current module and located below the current module, as a updated current module in the UI, sets the display ordinate of the updated current module to be the result, sets the display abscissa of the updated current module to be zero, sets the display width of the updated current module to be the screen height of the device, go back to Step 123.

Step 139, the client monitors the screen orientation of the device.

Step 140, the client determines whether the screen orientation of the device changes, if yes, go back to Step 121; otherwise, go back to Step 139.

FIG. 1 (continued)

...continued from previous page

Step 501, the client initiates, obtains a UI data packet from the server, parses the UI data packet and obtains drawing information of the global module and drawing information of the respective components in the UI.
Step 502, the client sets central point of global module to be the same as central point of UI view and sets the background of the UI view to be black.
Step 503, the client obtains attribution information of the device.
Step 504, the client determines the screen orientation of the device.
Step 505, the client determines the width-height aspect ratio of the global module according to the drawing information of the global module.
Step 506, the client sets the display height of the global module as screen height of the device, obtains the display width of the global module according to the display height and drawing information of the global module.
Step 507, the client sets the display height of the global module as screen height of the device, sets the display width of the global module as screen width of the device.
Step 508, the client sets the display width of the global module as screen width of the device, obtains display height of the global module according to the display width and drawing information of the global module.
Step 509, the client determines the width-height aspect ratio of the global module according to the drawing information of the global module;
Step 510, the client sets the display height of the global module as screen width of the device, obtains the display width of the global module according to the display height and drawing information of the global module, obtains the display width of the global module.
Step 511, the client sets the display height of the global module as screen width of the device and sets the display width of the global module as screen height of the device.
Step 512, the client sets the display width of the global module as screen height of the device and obtains the display height of the global module according to the display width and drawing information of the global module.
Step 513, the client selects a component, which is not drawn, as the current component from the global module, obtains the display width, display height and display coordinates of the current component according to the display width and display height of the global module and the drawing information of the current component.
Step 514, the client determines whether requires to fill a picture in the current component.
Step 515, the client obtains a resource file required to be filled in the current component according to the content of the current component, draws the current component according to the obtained resource file and the display width, display height and display coordinate of the current component.
Step 516, the client determines whether the screen density of the device is more than a preset density value.
Step 517, the client obtains a corresponding high resolution picture according to content of the current component.
Step 518, the client determines whether other resource files are required to be filled in the current component except for the picture.
Step 519, the client draws the current component according to the obtained high resolution picture, the display width, display height and display coordinates of the current component.
Step 520, the client obtains other resource files except for the picture according to the content of the current component, draws the current component according to the display width, display height and display coordinates of the current component, the obtained high resolution picture and other resource files except for the picture.
Step 521, the client obtains a corresponding low resolution picture according to the content of the current component.
Step 522, the client determines whether requires to fill other resource files in the current component except for the picture.
Step 523, the client draws the current component according to the obtained low resolution picture, the display width, display height and display coordinates of the current component, execute Step 525.
Step 524, the client obtains other resource files except for the picture according to the content of the current component, draws the current component according to the display width, display height and display coordinates of the current component, and the obtained high resolution picture and other resource files except for the picture.
Step 525, the client determines whether the global module includes the component, which is not drawn.
Step 526, the client monitors the screen orientation of the device.
Step 527, the client determines whether the screen orientation of the device changes.

FIG. 5 (continued)

SCREEN ADAPTATION METHOD AND APPARATUS

FIELD OF THE INVENTION

The present invention relates to a method for screen adaptation and apparatus thereof, which relates to terminal display technology.

PRIOR ART

With development of mobile communication technology, more and more types of mobile device increases. Different mobile devices are different in operating system and screen size.

In prior art, primary layer differences among operating systems can be shielded by mobile insert software technology, which realizes rapid developing of crossing-system. A client can be assured to be run in different systems with one set of UI (user interface) which is developed by a developer.

The prior art has at least following disadvantages: due to different mobile devices, screen sizes of the devices are different; a developer requires to make different UI according to different screen sizes; the UI must be processed by resetting high-fidelity picture, slicing process, coding and testing so as to adapt different mobile devices, which lead to heavy working load of screen adaptation and low efficiency of screen adaptation.

SUMMARY OF THE INVENTION

The object of the present invention is to provide a method for screen adaptation and a device thereof, by which workload of the screen adaptation is light and efficiency of the screen adaptation is high.

Therefore, according to one aspect of the present invention, a method for screen adaptation is provided, which includes following steps:

A1) obtaining, by a client, UI (user interface) data packet/package from a server, parsing the UI data packet, obtaining drawing information of respective modules and drawing information of respective components, the modules of the UI being arranged in vertical direction, each module containing one or a plurality of components;

A2) determining, by the client, screen orientation of a device on which the client is, if the screen orientation is portrait screen, executing step A3; if the screen orientation is landscape screen, executing step A4;

A3) setting, by the client, display width of respective modules to be screen width of the device, obtaining display width, display height and display coordinates of the respective components according to display width of the respective modules, the drawing information of the respective modules and the drawing information of the respective components; drawing the respective components according to the display width, display height and display coordinates of the respective components and resource files required to be filled in the respective components and executing step A5;

A4) setting, by the client, the display width of the respective module to be screen height of the device, obtaining display width, display height and display coordinates of the respective components according to display width of the respective modules, the drawing information of the respective modules and the drawing information of the respective components; drawing the respective components according to the display width, display height and display coordinates of the respective components and resource files required to be filled in the respective components and executing step A5; and A5) monitoring, by the client, screen orientation of the device, going back to step A2 when detecting that screen orientation of the device changes.

According to another aspect of the present invention, another method for screen adaptation is provided, which includes following steps:

E1) obtaining, by the client, a UI data packet, parsing the UI data packet, obtaining drawing information of a global module and drawing information of respective components, E2) determining, by the client, screen orientation of a device on which the client is, if the screen orientation is portrait screen, executing step E3; if the screen orientation is landscape screen, executing step E4;

E3) setting, by the client, display width of the global module to be screen width of the device, obtaining display height of the global module according to display width of the global module and drawing information of the global module, executing Step E5;

E4) setting, by the client, the display height of the global module to be screen width of the device, obtaining the display width of the global module according to the display height of the global module and the drawing information of the global module, executing Step E5;

E5) obtaining display width, display height and display coordinates of the respective components according to the display width of the global module, the display height of the global module, the drawing information of respective components; drawing the respective components according to the display width, display height and display coordinates of the respective components and resource files required to be filled in the respective components and executing Step E6;

E6) monitoring, by the client, the screen orientation of the device, going back to Step E2 when detecting that screen orientation of the device changes.

According to another aspect of the present invention, another method for screen adaptation is provided, which includes following steps:

H1) obtaining, by a client, UI data packet from a server, parsing the UI data packet, obtaining drawing information of respective modules and drawing information of respective components;

H2) according to screen size of a device on which the client is, drawing information of the respective modules and drawing information of the respective components, obtaining, by the client, portrait screen display information and landscape screen display information of the respective components;

H3) determining, by the client, screen orientation of a device on which the client is, if the screen orientation is portrait screen, executing step H4; if the screen orientation is landscape screen, executing step H5;

H4) drawing, by the client, the respective components according to the portrait screen display information of the respective components and executing step H6;

H5) drawing, by the client, the respective components according to the landscape screen display information of the respective components and executing step H6

H6) monitoring, by the client, screen orientation of the device, going back to step H7 when detecting that screen orientation of the device changes;

H7) determining, by the client, the screen orientation of the device on which the client is, if the screen orientation is portrait screen, executing Step H8; if the screen orientation is landscape screen, executing step H9;

H8) drawing, by the client, the respective components according to the portrait screen display information of the respective components, executing step H6; and H9) drawing, by the client, the respective components according to the landscape screen display information of the respective components, executing step H6.

The advantages of the present invention at least include that: UI is drawn according to screen size and screen orientation of the device, the drawing information of the respective components in UI so that screen adaptation and landscape-portrait screen switching is performed among different screen sizes of the device, which improves smoothness, reduces workload of screen adaptation and improves screen adaptation efficiency.

BRIEF DESCRIPTION OF THE ACCOMPANYING DRAWINGS

DETAILED DESCRIPTION OF THE PREFERRED EMBODIMENTS

Figure 1:
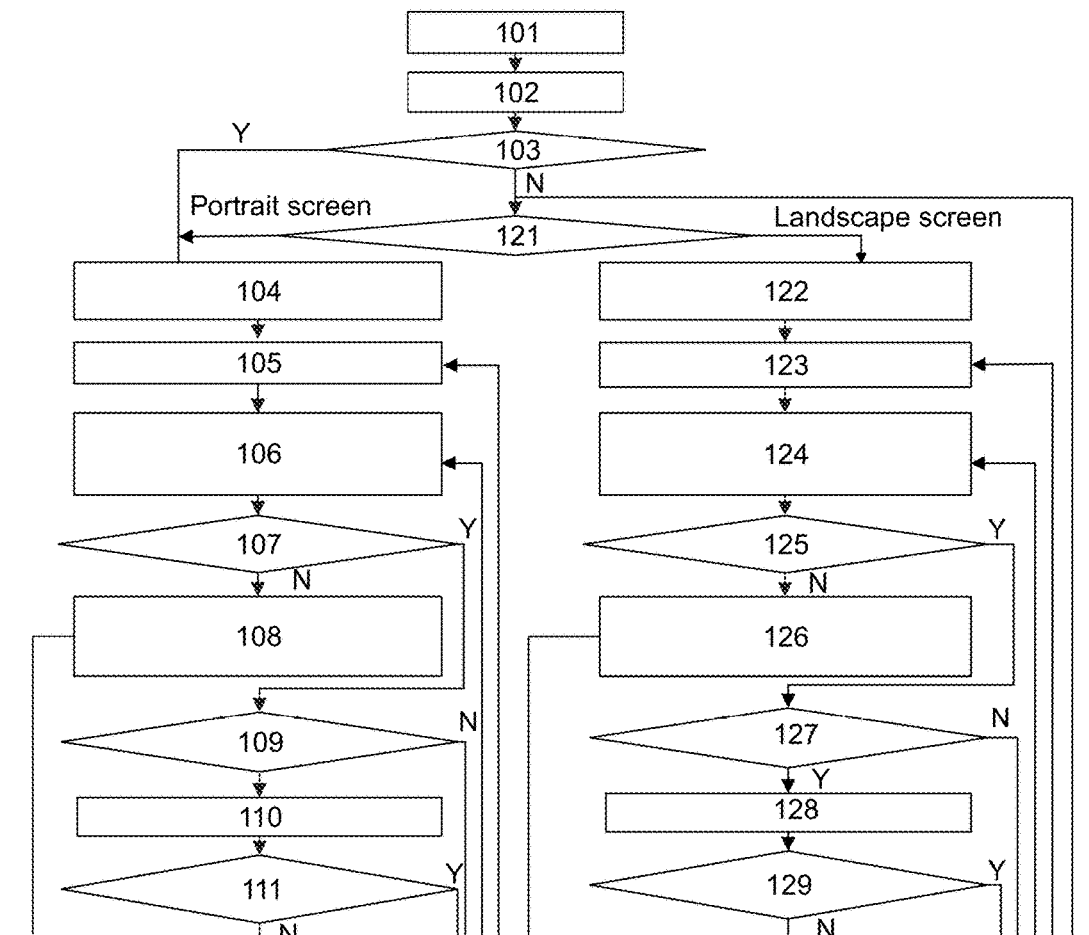
FIG. 1 is a flow diagram of a method for screen adaptation of Embodiment 1 of the present invention.
Figure 1:
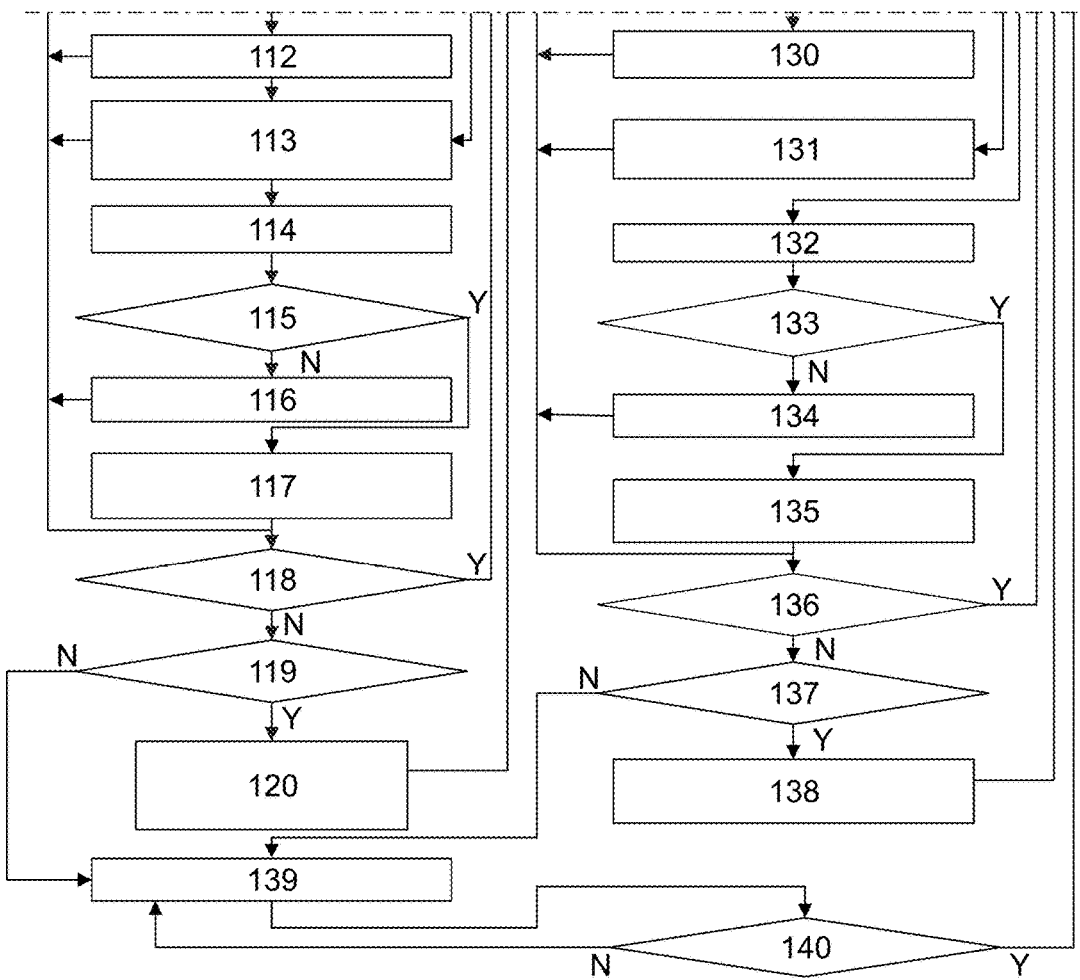

The technical solutions of the embodiments of the disclosure are described clearly and completely in conjunction with the accompanying drawings as follows. Apparently, the described embodiments are merely a part of but not all of the embodiments according to the disclosure. Based on the described embodiments of the disclosure, other embodiments obtained by those skilled in the art without any creative work belong to the scope of the disclosure.

The present invention is applied to a system including a server and a client; the client installed on a device is configured to draw UI on the device; UI can be divided into a plurality of modules; the modules are arranged vertically; each module includes one or more components. The server generates and stores a UI packet; and the UI packet includes drawing information of respective modules and drawing information of respective components of the modules.

Correspondingly, the client obtains the UI packet, parses the UI packet, obtains the drawing information of the respective modules and drawing information of the respective components and drawing UI according to the drawing information above.

In this case, the drawing information of the module can be wide-height aspect ratio or height-wide aspect ratio of the module; the drawing information of the component includes relative coordinates of the component, relative width of the component and relative height of the component, and the relative coordinates of the component includes relative abscissa of the component and relative ordinate of the component.

Correspondingly, the format of the drawing information of the component is: (relative abscissa of the component, relative ordinate of the component, relative width of the component and relative height of the component), the content of the drawing information can be represented in form of percentage.

In each embodiment, a wide-height aspect ratio of the module is ratio between width of the module in a UI effective picture and height of the module in the UI effective picture, the height-width aspect ratio is ratio between height of the module in the UI effective picture and width of the module in the UI effective picture. The relative abscissa of the component is ratio between abscissa of a module to which the component belongs and the width of the module in the effective picture; the relative ordinate of the component is ratio between the ordinate of the module to which the component belongs and height of the module in the UI effective picture; the relative width of the component is the ratio between the width of the component in the UI effective picture and the width of the module, in which the component belongs, in the UI effective picture; the relative height of the component is ratio between the height of the component in the UI effective picture and the height of the component of the module, in which the component belongs, in the effective picture.

In this case, the width of respective modules in the UI effective picture is total width of the UI effective picture; the abscissa of the component in the module is the left top corner of the component by taking the left top corner of the module as coordinate origin; the ordinate of the component in the module is the ordinate of the left top corner of the component by taking the left top corner of the module as coordinate origin.

As shown in FIG. 1, a flow process diagram of the method for screen adaptation according to the present invention is provided. The method comprises following steps:

Step 101, the client initiates, obtains a UI data packet from the server, parses the UI packet, obtains drawing information of respective modules in the UI and drawing information of respective components.

For example, the UI is divided into module 1, module 2 and module 3; in this case, module 1 includes component 1 and component 2; module 2 includes component 3; module 3 includes component 4, component 5 and component 6; the client parses the data UI packet and obtains drawing information (width-height aspect ratio) of the module 1, module 2 and module 3 which are respectively 40%, 30% and 30%, the drawing information of component 1 (20%, 10%, 70%, 30%), the drawing information of component 2 (20%, 50%, 70%, 40%) and drawing information of component 3 (20%, 10%, 70%, 80%), drawing information of component 4 (10%, 10%, 40%, 90%), drawing information of component 5 (60%, 10%, 30%, 30%) and drawing information of component 6 (60%, 60%, 30%, 40%).

Step 102, the client obtains attribution information of the device.

In this case, the attribution information of the device includes information such as type information, screen size, screen orientation and screen resolution, etc. of the device; the screen size includes screen width and screen height.

In Embodiment 1, the client can invoke function UI_USER_INTERFACE_IDIOM to obtain type information of the device, takes value of size attribution in [UIScreen mainScreen] bounds as screen size of the device; invokes function of UIInterfaceOrientationIsPortrait in order to obtain screen orientation of the device; takes value of size attribution in [UIScreen mainScreen] currentMode as screen resolution of the device.

For example, the type information of the device is "iPhone4", the screen size of the device is 251 pt*141 pt; the screen orientation of the device is landscape, the screen resolution is 1136 px*640 px.

Step 103, the client determines whether the device is preset type device, if yes, execute Step 104; if no, execute Step 121.

Specifically, the client can determine that whether the device is preset type device according to type information of the device; in this case, the prest type device can be a cellphone.

For example, the type information of the device is "iPhone4", the client can determine that the device is cellphone.

Step 104, the client selects the module on the top of UI as the current module, sets the display width of the current module as screen width of the device, sets the display coordinates of the current module as left top corner of the device screen.

For example, the screen size of the device is 251 pt*141 pt; when the left top corner of the device screen is coordinate origin, the client selects module 1 on the top of UI as the current module, sets the display width of the current module as 141 pt, sets the display coordinate of the current module as (0,0).

Step 105, the client obtains the display height of the current module according to the drawing information and display width of the current module.

Specifically, when the drawing information of the current module is width-height aspect ratio, the client can obtain a result of dividing the display width of the current module by the width-height aspect ratio of the current module, take the result as the display height of the current module; when the drawing information of the current module is height-width aspect ratio, the client can obtain a result of multiplying the display width of the current module by the height-width aspect ratio of the current module, taking the result as the height of the current module.

For example, the drawing information of the current module is width-height aspect ratio; the width-height aspect ratio is 40%; the display width of the current module is 141 pt; the display height of the current module calculated by the client=141 pt/40%=352.5 pt.

Step 106, the client selects a component which is not drawn as the current component, obtains the display width, display height and display coordinates of the current component according to the display width, display height and the drawing information of the current component.

In this case, the display coordinates of the current component is coordinates of the left top corner of the current component, which include the display ordinate and the display abscissa of the current component, by taking the left top corner of the current module as coordinate origin.

Correspondingly, the client can obtain a product of display width of the current module and relative width of the current component, take the product as the display width of the current component, obtain a product of the display height of the current module and the relative height of the current component, take the product as the display height of the current component; obtain a product of the display width of the current module and the relative abscissa of the current component, take the product as the display abscissa of the current component; obtain a product of display height of the current module and relative ordinate of the current component, take the product as the display ordinate of the current component.

For example, the client selects component 1 of the current module as the current component, the display width of the current module is 141 pt; the display height of the current module is 352.5 pt; the display coordinates of the current module is (0, 0); the drawing information of the current component is (20%, 10%, 70%, 30%); the display width of the current component calculated by the client=70%*141 pt=98.7 pt; the calculated display height of the current component=30%*352.5 pt=105.75 pt; the calculated display abscissa of the current component=20%*141 pt=28.2 pt; the calculated display ordinate of the current component=10%*352.5 pt=35.25 pt.

Step 107, the client determines whether a picture is required to be filled in the current component, if yes, execute Step 109; otherwise, execute Step 108.

Specifically, the client can determine whether the content of the current component includes picture information, if yes, that the picture is required to be filled in the current component; if no, that the picture is not required to be filled in the current component is determined.

For example, the name of the current component is Label; the content of the component includes following information: Label.Pic=@"demo.png"; the client determines that the content of the current component includes picture information "demo.png".

Step 108, the client obtains resource file of the current component required to be filled in the current component according to the content of the current component; and draws the current component according to the obtained resource file and the display width, display height and display coordinates of the current component, then execute Step 118.

Specifically, the client can take the left top corner of the current module as coordinate origin, locate the current component according to the display width, display height and display coordinates and fill the obtained resource file in the current component, display the current component and implement drawing of the current component.

In this case, the resource file can be files such as video, words, etc.

Step 109, the client determines whether screen density of the device is more than a preset density value, if yes, executes Step 110; otherwise, execute Step 114.

Specifically, the client can obtain screen density of the device directly and determine whether the screen density of the device is more than a preset density value; the client can also obtain screen resolution and screen size of the device, obtain screen density of the device according to the screen resolution and the screen size of the device and determine whether the screen density of the device is more than the preset density value.

In the Embodiment 1, the client can calculate screen density PPI of the device according to following formula:

$$PPI = \frac{dp}{di} = \frac{\sqrt{wp^2 + hp^2}}{di}$$

In the formula, dp is resolution of screen diagonal of the device, wp is screen lateral resolution of the device, hp is screen vertical resolution of the device, di is length of screen diagonal of the device.

For example, when the screen resolution of the device is 1136 px*640 px, the screen size of the device is 251 pt*141 pt and the preset density value is 300 ppi, the client calculates out that the size density of the device is 326 ppi according to the screen resolution and screen size of the device and determines that the screen desity of the device is more than the preset density value.

Step 110, the client obtains a corresponding high resolution picture according to content of the current component.

Specifically, the client can obtain the high resolution picture, which is corresponding to information of the picture, from a locally stored material package or by network asynchronously; the client can generate the high resolution picture, which is corresponding to information of the picture dynamically.

In the Embodiment 1, the locally stored material package can store a high resolution picture and a low resolution picture which are correspond to a same picture information.

For example, the content of the current component includes picture information "demo.png"; the locally stored material package stores the high resolution picture "demo@2x.png" and the low resolution picture "demo.png" which are corresponding to "demo.png"; the client obtains the high resolution picture "demo@2x.png" from the locally stored material package.

Step 111, the client determines whether other resource files required to be filled in the current component except for the picture, if yes, execute Step 113; otherwise, execute Step 112.

Specifically, the client can determine whether the content of the current component includes information of other picture information except for the information of the picture; if yes, the client determines that other source files are required to be filled in the current component except for the picture; otherwise, the client determines that other source files are not required to be filled in the current component except for the picture.

Step 112, the client draws the current component according to the obtained high resolution picture, the display width, the display height and the display coordinates of the current component; execute Step 118.

Specifically, the client can take the left top corner of the current module and locate the current component according to the display width, display height and display coordinates of the current component, and fill the obtained high resolution picture in the current component, display the current component so as to implement the drawing of the current component.

For example, the display coordinates of the current component is (28.2, 35.25), the display width is 98.7 pt, the display height is 105.75 pt; the client obtains the high resolution picture "demo@2x.png" of the current component required to be filled in the current component, generates component with size of (98.7, 105.75) at position of coordinates of (28.2, 35.25) and fills the high resolution picture "demo@2x.png" in the component.

Step 113, the client obtains other resource files except for the picture according to the content of the current component, draws the current component according to the display width, display height and display coordinates of the current component, the obtained high resolution picture and other resource files except for the picture; execute Step 118.

Specifically, the client can take the left top corner of the current module as coordinate origin, locate the current component according to the display width, display height and display coordinates of the current component, fill the obtained high resolution picture and other resource files in the current component, display the current component so as to draw the current component.

Step 114, the client obtains a corresponding low resolution picture according to the content of the current component.

Specifically, the client can obtain the low resolution picture, which is corresponding to information of the picture, from a locally stored material package or by network asynchronously; the client can dynamically generate the low resolution picture, which is corresponding to information of the picture.

In Embodiment 1, the locally stored material package can store the high resolution picture and the low resolution picture, which are corresponding to the same picture information.

For example, the content of the current component includes picture information "demo.png"; the locally stored material package stores the high resolution picture "demo@2x.png" and the low resolution picture "demo.png" which are corresponding to "demo.png"; the client obtains the low resolution picture "demo@2x.png" from the locally stored material package.

Step 115, the client determines whether other resource files are required to be filled in the current component except for the current component, if yes, execute Step 117; otherwise, execute Step 116.

Step 116, the client draws the current component according to the obtained low resolution picture, the display width, the display height and the display coordinates of the current component; execute Step 118.

Specifically, the client can take the left top corner of the current module and locate the current component according to the display width, display height and display coordinates of the current component, and fill the obtained low resolution picture in the current component, display the current component so as to implement the drawing of the current component.

Step 117, the client obtains other resource files except for the picture according to the content of the current component, draws the current component according to the display width, display height and display coordinates of the current component, the obtained low resolution picture and other resource files except for the picture; execute Step 118.

Specifically, the client can take the left top corner of the current module as coordinate origin, locate the current component according to the display width, display height and display coordinates of the current component, fill the obtained high resolution picture and other resource files in the current component, display the current component, so as to draw the current component.

Step 118, the client determines whether the current module includes the component, which is not drawn, if yes, go back to Step 106; otherwise, execute Step 119.

Step 119, the client determines whether UI includes the unprocessed module, if yes, execute Step 120; otherwise, execute Step 139.

Step 120, the client obtains a result of adding the display ordinate of the current module to the display height of the current module, select a module, which is adjacent to the current module and located below the current module, as a updated current module in the UI, sets the display ordinate of the updated current module to be the result, sets the display abscissa of the updated current module to be zero, sets the display width of the updated current module to be the screen width of the device, go back to Step 105.

For example, when the screen size of the device is 251 pt*141 pt, the current module is module 1, the display coordinates of the current module is (0, 0) and the display height of the current module is 352.5 pt, the client obtains a result of adding the display ordinate of the current module to the display height of the current module, i.e. 0+352.5 pt=352.5 pt, selects module 2, which is adjacent to module 1 and below to the module 1, in the UI as the updated current module, sets the display coordinates of the updated current module to be (0, 352.5 pt) and sets the display width of the updated current module to be 141 pt.

Step 121, the client determines orientation of the device, if the screen orientation is portrait screen, go back to Step 104; if the screen orientation is landscape screen, execute Step 122.

Step 122, the client select the module on the top of the UI, sets the display width of the current module to be screen height of the device and sets the display coordinates of the current module to be left top corner of the device screen.

For example, when the screen size of the device is 251 pt*141 pt and the left top corner of the device screen is coordinate origin, the client selects module 1 on the top of the UI as the current module, sets the display width of the current module to be 251 pt and sets the display coordinates of the current module to be (0, 0).

Step 123, the client obtains the display height of the current module according to the drawing information and the display width of the current module.

Step 124, the client selects a component, which is not drawn, as the current component from the current module, obtains the display width, display height and display coordinates of the current component according to the display width and display height of the current module and the drawing information of the current component.

Step 125, the client determines whether requires to fill a picture in the current component, if yes, execute Step 127; otherwise, execute Step 126.

Step 126, the client obtains a resource file required to be filled in the current component according to the content of the current component, and draws the current component according to the obtained resource file and the display width, display height and display coordinates of the current component; execute Step 136.

Step 127, the client determines whether the screen density of the device is more than a preset density value, if yes, execute Step 128; otherwise, execute Step 132.

Step 128, the client obtains a corresponding high resolution picture according to the content of the current component.

Step 129, the client determines whether other resource files are required to be filled in the current component except for the picture, if yes, execute Step 131; otherwise, execute Step 130.

Step 130, the client draws the current component according to the obtained high resolution picture, the display width, display height and display coordinates of the current component; execute Step 136.

Step 131, the client obtains other resource file except for the picture according to the content of the current component, draws the current component according to the display width, display height and display coordinates of the current component, the obtained high resolution picture and other resource files except for the picture; execute Step 136.

Step 132, the client obtains a corresponding low resolution picture according to the content of the current component.

Step 133, the client determines whether other resource files except for the picture are required to be filled in the current component, if yes, execute Step 135; otherwise, execute Step 134.

Step 134, the client draws the current component according to the obtained low resolution picture, the display width, display height and display coordinates of the current component; execute Step 136.

Step 135, the clients obtains other resource files except for the picture according to the content of the current component, draws the current component according to the display width, display height and display coordinates of the current component, the obtained low resolution picture and other resource files except for the picture; execute Step 136.

Step 136, the client determines whether the current module includes a component, which is not drawn, if yes, execute Step 124; otherwise, execute Step 137.

Step 137, the client determines whether UI includes an unprocessed module, if yes, execute Step 138; otherwise, execute Step 139.

Step 138, the client obtains a result of adding the display ordinate of the current module to the display height of the current module, select a module, which is adjacent to the current module and located below the current module, as a updated current module in the UI, sets the display ordinate of the updated current module to be the result, sets the display abscissa of the updated current module to be zero, sets the display height of the updated current module to be the screen width of the device, then goes back to Step 123.

Step 139, the client monitors the screen orientation of the device.

Step 140, the client determines whether the screen orientation of the device changes, if yes, go back to Step 121; otherwise, go back to Step 139.

In Embodiment 1, the client draws UI according to screen size and screen orientation of the device, the drawing information of the respective components in UI so that screen adaptation and landscape-portrait screen switching is performed among different screen sizes of the device, which improves smoothness, reduces workload of screen adaption and improves screen adaption efficiency.

In other embodiments of the present invention, the client can obtain and store the portrait screen display information and landscape screen display information of respective components at backend in advance, select corresponding display information according to screen orientation of the device, draw the respective components in the UI according to the selected display information.

Figure 2:
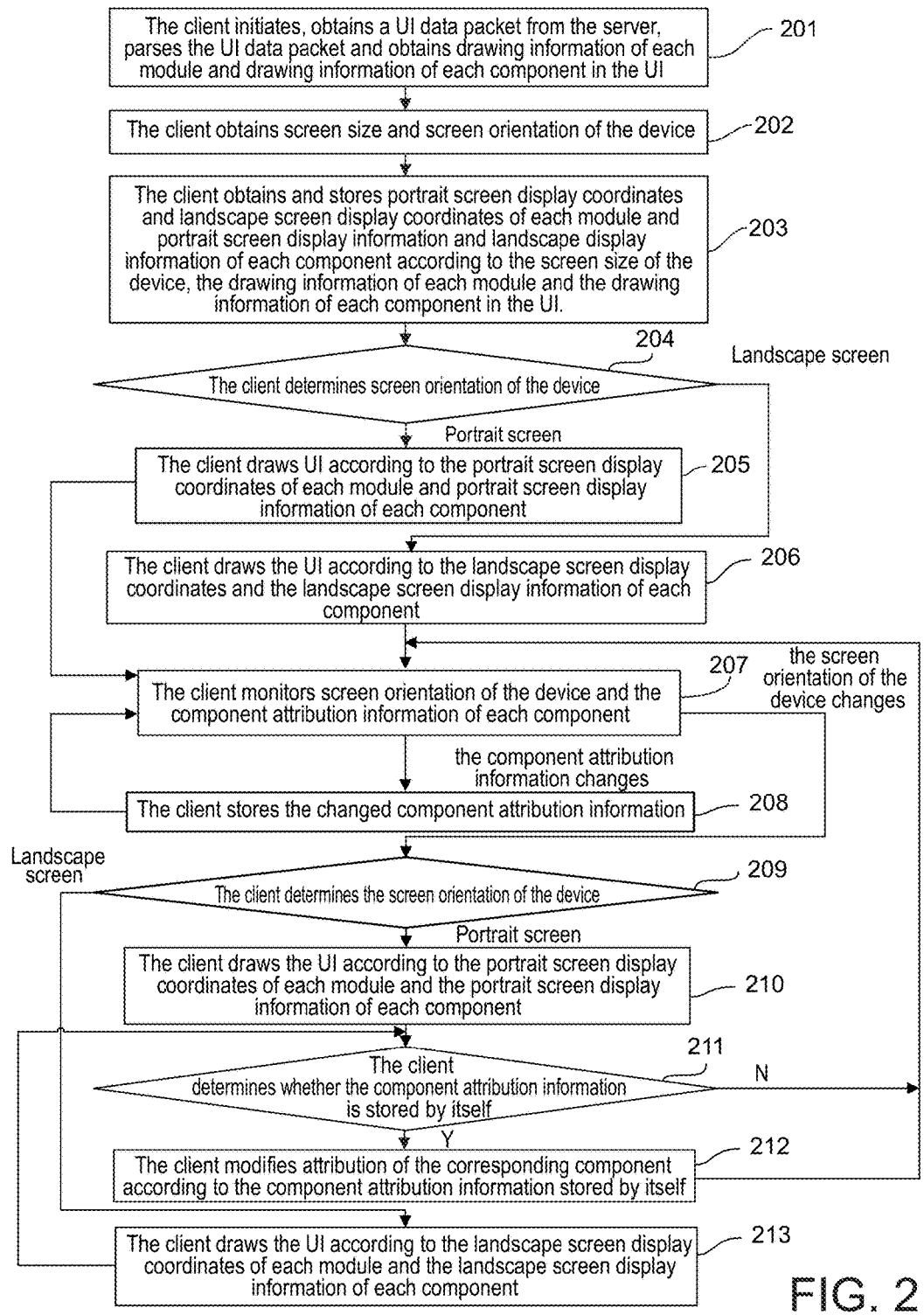
FIG. 2 is a flow diagram of another method for screen adaptation of Embodiment 2 of the present invention.

As shown in FIG. 2, a flow diagram for another method for screen adaption of the present invention is provided, which includes:

Step 201, the client initiates, obtains a UI data packet from the server, parses the UI data packet and obtains drawing information of respective modules and drawing information of respective components in the UI.

In this case, the drawing information of the module can be width-height aspect ratio or height-width aspect ratio of the module, the drawing information of the component includes relative coordinates of the component, relative width of the component and relative height of the component; the relative coordinate of the component includes relative abscissa coordinates and relative ordinate of the component.

Step 202, the client obtains screen size and screen orientation of the device.

In this case, the screen size includes screen width and screen height.

Step 203, the client obtains and stores portrait screen display coordinates and landscape screen display coordinates of respective modules and portrait screen display information and landscape display information of respective components according to the screen size of the device, the drawing information of respective modules and the drawing information of respective components in the UI.

In this case, the portrait display information of the component includes portrait screen display coordinates of the component, the portrait screen display width of the component and the portrait screen display height of the component;

the portrait screen display coordinates of the component includes portrait screen display abscissa of the component and portrait screen display ordinate of the component; the landscape screen display information of the component includes landscape screen display coordinates of the component, the landscape display width of the component and the landscape screen display height of the component; the landscape screen display coordinates of the component includes landscape screen display abscissa of the component and landscape screen display ordinates of the component.

Step 204, the client determines screen orientation of the device, if the screen orientation is portrait screen, execute Step 205; if the screen orientation is landscape screen, execute Step 206.

Step 205, the client draws UI according to the portrait screen display coordinates of respective modules and portrait screen display information of the respective components, execute Step 207.

Specifically, the client can take the left top corner of a module, to which respective components belongs, as coordinate origin, locate the respective components according to the portrait screen display width, portrait screen display height and portrait screen display coordinates of respective components, fill the corresponding resource file in respective components, display respective components so as to realize drawing of UI.

Step 206, the client draws the UI according to the landscape screen display coordinates and the landscape screen display information of respective components; execute Step 207.

Specifically, the client can take the left top corner of a module, to which respective components belongs, as coordinate origin, locate the respective components according to the landscape screen display width, landscape screen display height and landscape screen display coordinates of the respective components, fill the corresponding resource file in the respective components, display the respective components so as to realize drawing of UI.

Step 207, the client monitors screen orientation of the device and the component attribution information of the respective components; when the component attribution information changes, execute Step 208; when the screen orientation of the device changes, execute Step 209.

Step 208, the client stores the changed component attribution information; go back to Step 207.

For example, when the user enters "123" in an input box of UI, the client monitors that the content attribution of input box component changes and stores the content attribution "123".

Step 209, the client determines the screen orientation of the device, if the screen orientation is portrait screen, execute Step 210; and if the screen orientation is landscape screen, execute Step 213.

Step 210, the client draws the UI according to the portrait screen display coordinates of respective modules and the portrait screen display information of the respective components.

Step 211, the client determines whether the component attribution information is stored by itself, if yes, execute Step 212; otherwise, execute Step 207.

Step 212, the client modifies attribution of the corresponding component according to the component attribution information stored by itself; go back to Step 207.

For example, when the client has stored content attribution "123" of the input box component, the client modified the content attribution of the corresponding input box component to be "123".

Step 213, the client draws the UI according to the landscape screen display coordinates of respective modules and the landscape screen display information of the respective components; go back to Step 211.

In Embodiment 2, the user interface can includes a plurality of modules and respective modules in the user interface are arranged vertically, each module includes one or a plurality of components; the portrait display information of the respective components includes the portrait screen display width, portrait screen display height and portrait screen display coordinates of the respective components; the landscape display information of the respective components includes the landscape screen display width, landscape screen display height and landscape screen display coordinates of the respective components.

Figure 3:
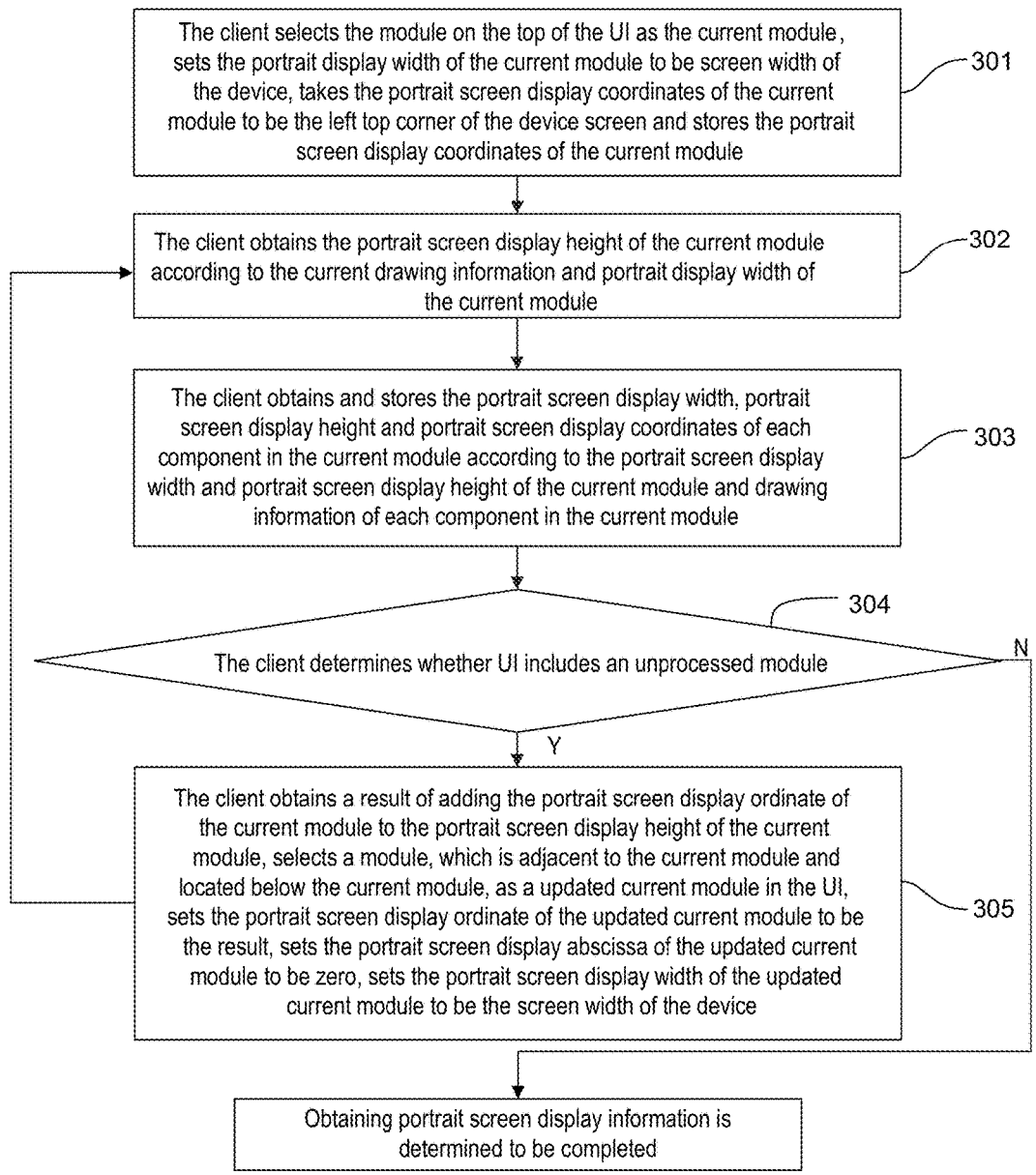
FIG. 3 is a flow diagram showing that a client obtains and stores portrait screen display information of respective components of UI in embodiments of the present invention.

Correspondingly, in above process, operation that the client obtains and stores the portrait screen display information of the respective components can be detailed as shown in flow diagram of FIG. 3, which includes the following steps:

Step 301, the client selects the module on the top of the UI as the current module, sets the portrait display width of the current module to be screen width of the device, takes the portrait screen display coordinates of the current module to be the left top corner of the device screen and stores the portrait screen display coordinates of the current module.

Step 302, the client obtains the portrait screen display height of the current module according to the current drawing information and portrait display width of the current module.

Specifically, when the drawing information of the current module is width-height aspect ratio, the client can obtain a result got by dividing the portrait screen display width of the current module by the width-height aspect ratio of the current module; when the drawing information of the current module is height-width aspect ratio, the client can obtain a result got by multiplying the portrait screen display width of the current module with the height-width aspect ratio of the current module, takes the result as the portrait screen display height of the current module.

Step 303, the client obtains and stores the portrait screen display width, portrait screen display height and portrait screen display coordinates of the respective components in the current module according to the portrait screen display width and portrait screen display height of the current module and drawing information of the respective components in the current module.

Specifically, the client obtains respective products of the portrait screen display width of the current module and relative width of respective components in the current module, takes the obtained products as portrait screen display width of respective components; the client obtains respective products of the portrait screen display height of the current module and relative height of respective components in the current module, takes the obtained products as portrait screen display height of respective components in the current module; the client obtains products of the portrait screen display width of the current module and the relative abscissas of respective components in the current module, takes the obtained products as portrait screen display abscissas of respective components in the current module; the client obtains products of the portrait screen display height of the current module and the relative ordinates of respective components in the current module, takes the obtained products as portrait screen display ordinates of respective components.

Step 304, the client determines whether UI includes an unprocessed module, if yes, execute Step 305; otherwise, obtaining portrait screen display information is determined to be completed.

Step 305, the client obtains a result of adding the portrait screen display ordinate of the current module to the portrait screen display height of the current module, selects a module, which is adjacent to the current module and located below the current module, as a updated current module in the UI, sets the portrait screen display ordinate of the updated current module to be the result, sets the portrait screen display abscissa of the updated current module to be zero, sets the portrait screen display width of the updated current module to be the screen width of the device, go back to Step 302.

Figure 4:
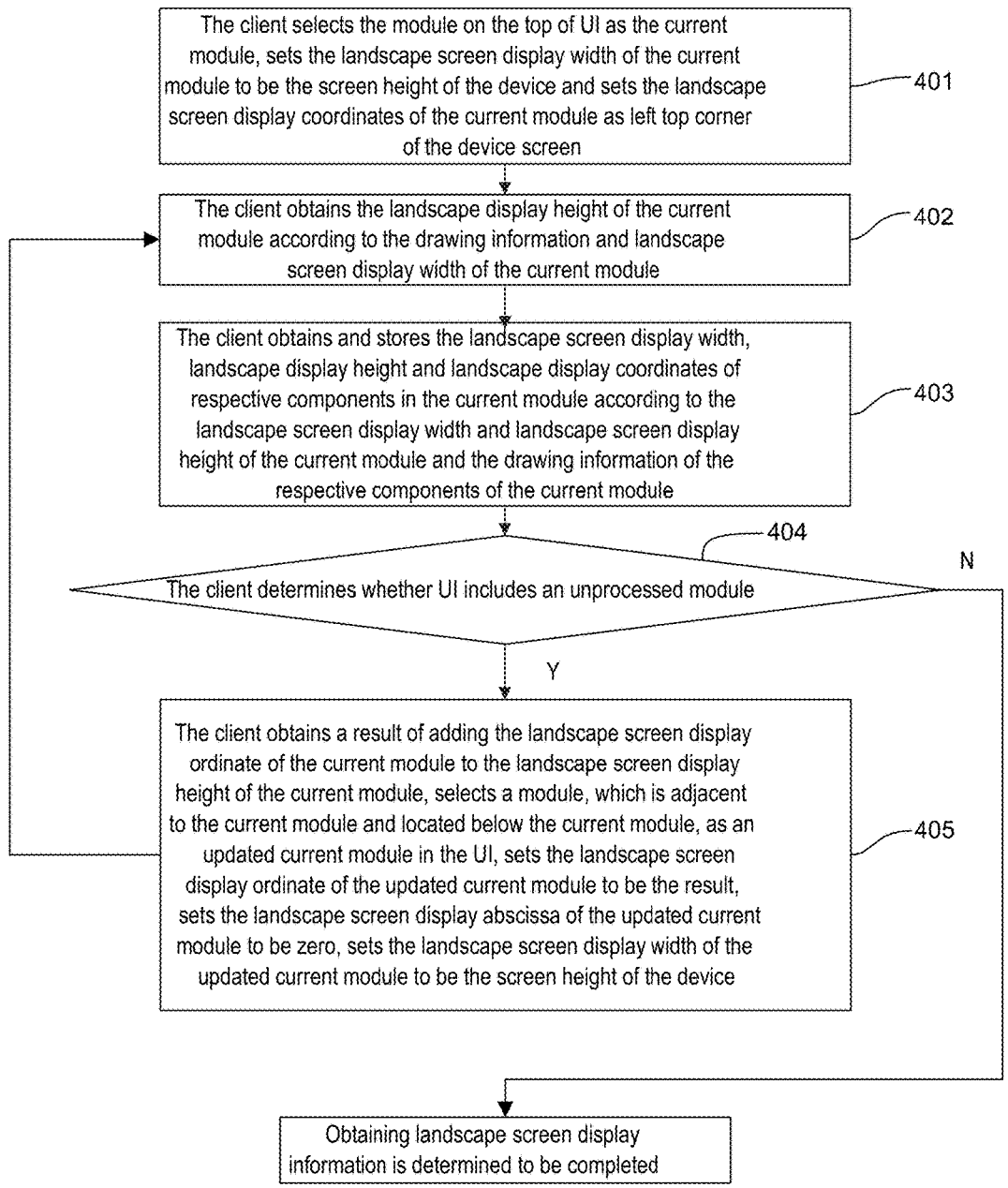
FIG. 4 is a flow diagram showing that the client obtains and stores landscape screen display information of respective components of UI in embodiments of the present invention.

Correspondingly, operation that the client obtains and stores operation of landscape screen display information of the respective components in the UI can be detailed as shown in flow diagram of FIG. 4, which includes the following steps:

Step 401, the client selects the module on the top of UI as the current module, sets the landscape screen display width of the current module to be the screen height of the device and sets the landscape screen display coordinates of the current module as left top corner of the device screen.

Step 402, the client obtains the landscape display height of the current module according to the drawing information and landscape screen display width of the current module.

Specifically, when the drawing information of the current module is width-height aspect ratio, the client can obtain a result of dividing the landscape screen display width of the current module by the width-height aspect ratio of the current module and takes the result as the landscape screen display height of the current module; when the drawing information of the current module is height-width aspect ratio, the client obtains a result of multiplying the landscape screen display width of the current module by the height-width aspect ratio of the current module and takes the result as the landscape display height of the current module.

Step 403, the client obtains and stores the landscape screen display width, landscape display height and landscape display coordinates of respective components in the current module according to the landscape screen display width and landscape screen display height of the current module and the drawing information of the respective components of the current module.

Specifically, the client obtains respective products of the landscape screen display width of the current module and relative width of respective components in the current module, takes the obtained products as landscape screen display width of respective components; the client obtains respective products of the landscape screen display height of the current module and relative height of respective components in the current module, takes the obtained products as landscape screen display height of respective components in the current module; the client obtains products of the landscape screen display width of the current module and the relative abscissas of respective components in the current module, takes the obtained products as landscape screen display abscissas of respective components in the current module; the client obtains products of the landscape screen display height of the current module and the relative ordinates of respective components in the current module, and takes the obtained products as landscape screen display ordinates of respective components.

Step 404, the client determines whether UI includes an unprocessed module, if yes, execute Step 405; otherwise, obtaining landscape screen display information is determined to be completed.

Step 405, the client obtains a result of adding the landscape screen display ordinate of the current module to the landscape screen display height of the current module, selects a module, which is adjacent to the current module and located below the current module, as an updated current module in the UI, sets the landscape screen display ordinate of the updated current module to be the result, sets the landscape screen display abscissa of the updated current module to be zero, sets the landscape screen display width of the updated current module to be the screen height of the device, go back to Step 402.

In the present embodiment, the client obtains and stores portrait screen display information and landscape screen display information according to the screen size of the device and drawing information of the respective components in the UI, uses the portrait screen display information or the landscape screen display information to draw the respective components according screen orientation of the device, so that screen adaptation and landscape-portrait screen switching is performed among different screen sizes of the device, which improves smoothness of screen adaptation and landscape-portrait screen switching, reduces workload of screen adaptation and improves screen adaptation efficiency.

It should be noted that, in other embodiments of the present invention, the UI further can includes only one global module; the global module includes all components in the UI. The server generates and stores the UI which includes drawing information of global module and the drawing information of the respective components in the global module.

In this case, the drawing information of the global module can be width-height aspect ratio or height-width aspect ratio of the global module. The drawing information of the component includes the relative coordinates of the component, the relative width of the component and the relative height of the component; the relative coordinates of the component include the relative abscissa of the component and the relative ordinate of the component.

In the present embodiment, the width-height aspect ratio of the global module is ratio between the width of the global module in the UI effective picture and the height of the global module in the UI effective picture; the height-width aspect ratio of the global module is ratio between the height of the global module in the UI effective picture and the width of the global module in the UI effective picture. The relative abscissa of the component is ratio between the abscissa of the component in the global module and the width of the global module in the UI effective picture; the relative ordinate of the component is ratio between the ordinate of the component in the global module and the height of the global module in the UI effective picture; the relative width of the component is the ratio between the width of the component in the UI effective picture and the width of the global module in the UI effective picture; and the relative height of the component is ratio between the height of the component in the UI effective picture and the height of the global module in the UI effective picture.

In this case, the width of the global module in the UI effective picture is total width of the UI effective picture; the height of the global module in the UI effective picture is total height of the UI effective picture; the abscissa of the component in the global module is abscissa of the left top corner of the component by taking the left top corner of the global module as coordinate origin; the ordinate of component in the global module is ordinate coordinate of the left top corner of the component by taking the left top corner of the global module as coordinate origin.

Figure 5:
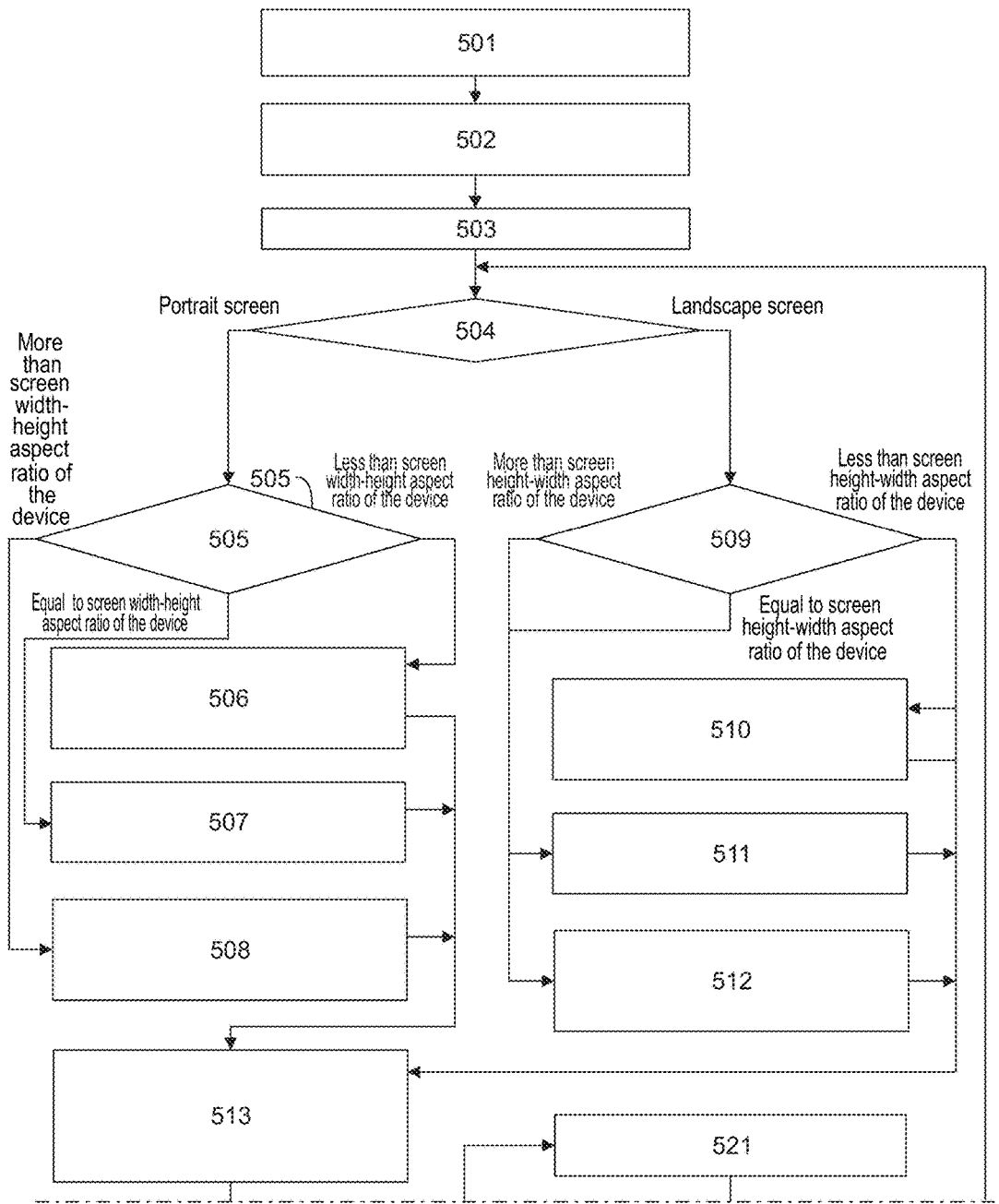
FIG. 5 is a flow diagram of another method for screen adaptation of Embodiment 3 of the present invention.
Figure 5:
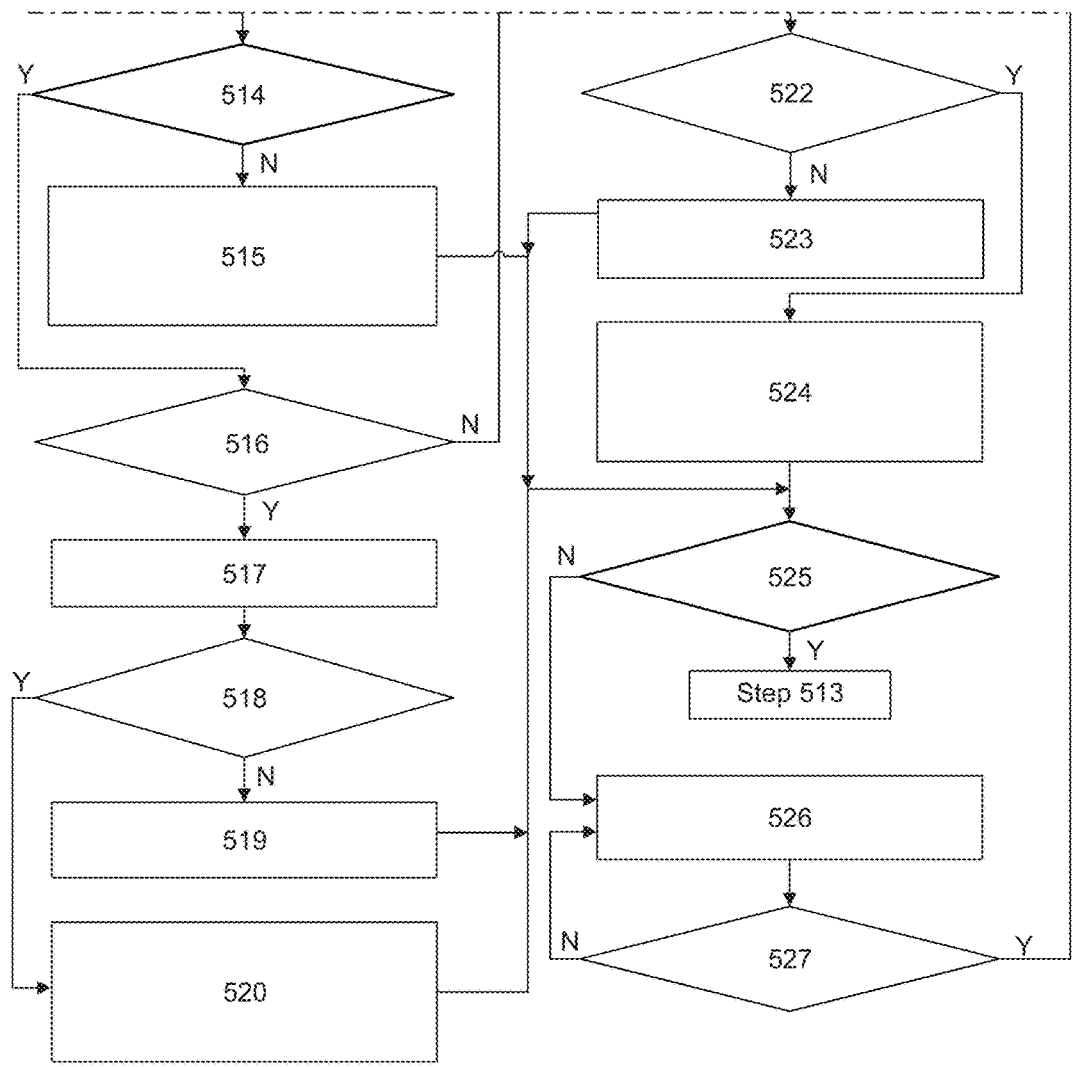

Correspondingly, the embodiment of the present invention provides another method for screen adaptation. As shown in FIG. 5, the method includes the following steps.

Step 501, the client initiates, obtains a UI data packet from the server, parses the UI data packet and obtains drawing information of the global module and drawing information of the respective components in the UI.

Step 502, the client sets central point of global module to be the same as central point of UI view and sets the background of the UI view to be black.

Specifically, the client can set the central point of global module to be the same as the central point of UI view by setting center attribution of the global module to be the same as center attribution of UI view; the client can set the background of the UI view to be black by setting Background attribution of the UI view to be a preset value, in which the preset value can be "Black Color".

Step 503, the client obtains attribution information of the device.

In this case, the attribution information of the device can includes type information, screen size, screen orientation, screen resolution, etc. of the device; the screen size includes screen width and screen height.

Step 504, the client determines the screen orientation of the device, if the screen orientation is portrait screen, execute Step 505; and if the screen orientation is landscape screen, execute Step 509.

Step 505, the client determines the width-height aspect ratio of the global module according to the drawing information of the global module; if the width-height aspect ratio of the global module is less than screen width-height aspect ratio of the device, execute Step 506; if the width-height aspect ratio of the global module is equal to the screen width-height ratio of the device, execute Step 507; if the width-height aspect ratio of the global module is more than the screen width-height aspect ratio of the device, execute Step 508.

Step 506, the client sets the display height of the global module as screen height of the device, obtains the display width of the global module according to the display height and drawing information of the global module; execute Step 513.

Step 507, the client sets the display height of the global module as screen height of the device, sets the display width of the global module as screen width of the device; execute Step 513.

Step 508, the client sets the display width of the global module as screen width of the device, obtains display height of the global module according to the display width and drawing information of the global module; execute Step 513.

Step 509, the client determines the width-height aspect ratio of the global module according to the drawing information of the global module; if the width-height aspect ratio of the global module is less than the screen height-width aspect ratio of the device, execute Step 510; if the width-height aspect ratio of the global module is equal to the screen height-width aspect ratio of the device, execute Step 511; if the width-height aspect ratio of the global module is more than the screen height-width aspect ratio of the device, execute Step 512.

Step 510, the client sets the display height of the global module as screen width of the device, and obtains the display width of the global module according to the display height and drawing information of the global module, obtains the display width of the global module; execute Step 513.

Step 511, the client sets the display height of the global module as screen width of the device and sets the display width of the global module as screen height of the device; execute Step 513.

Step 512, the client sets the display width of the global module as screen height of the device and obtains the display height of the global module according to the display width and drawing information of the global module; execute Step 513.

Step 513, the client selects a component, which is not drawn, as the current component from the global module, obtains display width, display height and display coordinates of the current component according to the display width and display height of the global module and the drawing information of the current component.

Step 514, the client determines whether requires to fill a picture in the current component, if yes, execute Step 516; otherwise, execute Step 515.

Step 515, the client obtains a resource file required to be filled in the current component according to the content of the current component, draws the current component according to the obtained resource file and the display width, display height and display coordinate of the current component; execute Step 525.

Step 516, the client determines whether the screen density of the device is more than a preset density value, if yes, execute Step 517; otherwise, execute Step 521.

Step 517, the client obtains a corresponding high resolution picture according to content of the current component.

Step 518, the client determines whether other resource files are required to be filled in the current component except for the picture; if yes, execute Step 520; otherwise, execute Step 519.

Step 519, the client draws the current component according to the obtained high resolution picture, the display width, display height and display coordinates of the current component; execute Step 525.

Step 520, the client obtains other resource files except for the picture according to the content of the current component, draws the current component according to the display width, display height and display coordinates of the current component, the obtained high resolution picture and other resource files except for the picture; execute Step 525.

Step 521, the client obtains a corresponding low resolution picture according to the content of the current component.

Step 522, the client determines whether requires to fill other resource files in the current component except for the picture; if yes, execute Step 524; otherwise, execute Step 523.

Step 523, the client draws the current component according to the obtained low resolution picture, the display width, display height and display coordinates of the current component, execute Step 525.

Step 524, the client obtains other resource files except for the picture according to the content of the current component, draws the current component according to the display width, display height and display coordinates of the current component, and the obtained high resolution picture and other resource files except for the picture; execute Step 525.

Step 525, the client determines whether the global module includes the component, which is not drawn, if yes, go back to the Step 513; otherwise, execute Step 526.

Step 526, the client monitors the screen orientation of the device.

Step 527, the client determines whether the screen orientation of the device changes, if yes, go back to Step 504; otherwise, go back to Step 526.

In Embodiment 3, the client draws UI according to screen size and screen orientation of the device, the drawing information of the module and components in UI so that screen adaptation and landscape-portrait screen switching is performed among different screen sizes of the device, which improves smoothness, reduces workload of screen adaptation and improves screen adaptation efficiency and user experience according to pictures corresponding to screen density.

It can be understood that all of or part of the steps in the above embodiments can be realized by hardware, a soft module executed by a processor or combination of both. The soft module can be stored in RAM (random-access memory), memory, ROM (read-only memory), electrically programmable read-only memory, electrically erasable programmable read-only memory, register, hard disc, mobile disc, CD-ROM (Compact Disc Read-Only Memory) or any other public known forms of storage media in the prior art.

The described embodiments are only preferred embodiments of the application and the embodiments are not intended to limit the application. Any alteration or change easily obtained by those skilled in the art based on the application should fall in the scope of protection of the application.

The invention claimed is:

1. A method for screen adoption comprising following steps:
   A1) obtaining, by a client, UI (user interface) data packet or package from a server, parsing the UI data packet, obtaining drawing information of respective modules and drawing information of respective components, in which the modules of the UI are arranged in vertical direction, and each module contains one or a plurality of components;
   A2) determining, by the client, screen orientation of a device on which the client itself is, in the case of the screen orientation is portrait screen, executing step A3; in the case of the screen orientation is landscape screen, executing step A4;
   A3) setting, by the client, display width of respective modules to be screen width of the device, obtaining display width, display height and display coordinates of the respective components according to display width of the respective modules, the drawing information of the respective modules and the drawing information of the respective components; and drawing the respective components according to the display width, display height and display coordinates of the respective components and resource files required to be filled in the respective components and executing step A5;
   A4) setting, by the client, the display width of the respective module to be screen height of the device, obtaining display width, display height and display coordinates of the respective components according to display width of the respective modules, the drawing information of the respective modules and the drawing information of the respective components; and drawing the respective components according to the display width, display height and display coordinates of the respective components and resource files required to be filled in the respective components and executing step A5; and
   A5) monitoring, by the client, screen orientation of the device, going back to step A2 when detecting that screen orientation of the device changes
   wherein step A3 specifically comprises:
   B1) selecting, by the client, a module on the top of the UI as current module, setting display coordinates of the current module to be left top corner of screen of the device, setting the display width of the current module as the screen width of the device, and obtaining display height of the current module according to drawing information and display width of the current module;
   B2) selecting, by the client, one component, which has not yet been drawn, from the current module to be a current component, and obtaining display width, display height and display coordinates of the current component according to the display width and display height of the current module and the drawing information of the current component;
   B3) drawing, by the client, the current component according to the display width, display height and display coordinates of the current component and a resource file required to be filled in the current component;
   B4) determining, by the client, whether the current module contains any component which has not yet been drawn, if yes, going back to step B2; otherwise, executing step B5;
   B5) determining, by the client, whether the UI contains any module which has not yet been processed, if yes, executing step B6; otherwise, executing step A5;
   B6) obtaining, by the client, a computing result by means of adding display ordinate of the current module to display height of the current module, and selecting a module in the UI, which is adjacent to the current module and located below the current module, as updated current module; and
   B7) setting, by the client, the display ordinate of the current module to be the computing result, setting the display abscissa of the current module to be 0, setting the display width of the current module as screen width of the device, and obtaining the display height of the current module according to the drawing information and display width of the current module, and going back to step B2.

2. The method of claim 1, wherein after step A1, the method further comprises: determining, by the client, whether the device is a preset type device, if yes, executing step A3; if no, executing step A2.

3. The method of claim 1, wherein step A4 specifically comprises:
   C1) taking, by the client, the module on the top of the UI as the current module, setting the display coordinates of the current module as left top corner of screen of the device, setting the display width of the current module as the screen height of the device, and obtaining display height of the current module according to drawing information and display width of the current module;
   C2) selecting, by the client, one component, which has not yet been drawn, from the current module to be the current component, and obtaining display width, display height and display coordinates of the current component according to the display width and display height of the current module and the drawing information of the current component;
   C3) drawing, by the client, the current component according to the display width, display height and display coordinates of the current component and the resource file required to be filled in the current component;

C4) determining, by the client, whether the current module contains any component which has not yet been drawn, if yes, going back to step C2; otherwise, executing step C5;

C5) determining, by the client, whether the UI contains any module which has not yet been processed, if yes, executing step C6; otherwise, executing step A5;

C6) obtaining, by the client, a computing result by means of adding display ordinate of the current module to display height of the current module, and selecting a module in the UI, which is adjacent to the current module and located below the current module, as updated current module; and C7) setting, by the client, the display ordinate of the current module to be the computing result, setting the display abscissa of the current module to be 0, setting the display width of the current module as screen height of the device, and obtaining the display height of the current module according to the drawing information and display width of the current module, and going back to step C2.

4. The method of claim 1, wherein the drawing information of the current module is width-height aspect ratio or height-width aspect ratio of the current module;

obtaining, by the client, the display height of the current module according to the drawing information and display width of the current module specifically comprises:

performing, by the client, operation of dividing the display width of the current module by the width-height aspect ratio of the current module, so as to obtain the display height of the current module; or performing, by the client, operation of multiplying the display width of the current module by the height-width aspect ratio of the current module, so as to obtain the display height of the current module.

5. The method of claim 1, wherein the drawing information of the current component comprises relative coordinates, relative width and relative height of the current component; the relative coordinates of the current component comprises relative ordinate and relative abscissa; the display coordinates of the current component are coordinates of the left top corner of the current component by taking the left top corner of the current module as coordinate origin; and the display coordinates of the current module comprise the display ordinate and display abscissa of the current component;

obtaining, by the client, the display width, display height and display coordinates of the current component according to the display width and display height of the current module and the drawing information of the current component specifically comprises:

multiplying, by the client, the display width of the current module by the relative width of the current component to obtain the display width of the current component; multiplying the display height of the current module by the relative height of the current component to obtain the display height of the current component; multiplying the display width of the current module by the relative abscissa of the current component to obtain the display abscissa of the current component; and multiplying the display height of the current module by the relative ordinate of the current component to obtain the display abscissa of the current component.

6. The method of claim 1, wherein drawing, by the client, the current component according to the display width, display height and display coordinates of the current component and the resource file required to be filled in the current component specifically comprises:

D1) determining, by the client, whether requires to fill a picture in the current component, if yes, executing step D3; otherwise, executing step D2;

D2) obtaining, by the client, the resource file required to be filled into the current component according to content of the current component, and drawing the current component according to the resource file and the display width, display height and display coordinates of the current component;

D3) determining, by the client, whether screen density of the device is greater than a preset density value, if yes, executing Step D4; otherwise, executing Step D7;

D4) obtaining, by the client, a corresponding high resolution picture according to the content of the current component, determining whether other resource files except for the picture are required to be filled in the current component, if yes, executing Step D6; otherwise, executing Step D5;

D5) drawing, by the client, the current component according to the high resolution picture, the display width, display height and display coordinates of the current component;

D6) obtaining, by the client, other resource files according to the content of the current component, and drawing current component according to the display width, display height and display coordinates of the current component and the high resolution picture and the other resources files;

D7) obtaining, by the client, a corresponding low resolution picture according to the content of the current component, determining whether other resource files except for the picture are required to be filled in the component, if yes, executing Step D9; otherwise, executing Step D8;

D8) drawing, by the client, the current component according to the low resolution picture, the display width, display height and display coordinates of the current component; and D9) obtaining, by the client, other resource files except for the picture according to the content of the current component, and drawing the current component according to the display width, display height and display coordinates of the current component, and the low resolution picture and the other resource files except for the picture.

7. The method of claim 6, wherein drawing, by the client, the current component according to the other resources files, the display width, display height and display coordinates of the current component specifically comprises:

taking, by the client, the left top corner of the current module as the coordinate origin, locating the current component according to the display width, display height and display coordinates of the current component, filling the resource file in the current component, and displaying the current component;

drawing, by the client, the current component according to the high resolution picture, the display width, display height and display coordinates of the current component specifically comprises:

taking, by the client, the left top corner of the current module as the coordinate origin, locating the current component according to the display width, display height and display coordinates of the current component, locating the current component, filling the high resolution picture into the current component, and displaying the current component;

drawing, by the client, the current component according to the display width, display height and display coordinates of the current component and the high resolution picture and other resource file specifically comprises:

taking, by the client, the left top corner of the current module as the coordinate origin, locating the current component according to the display width, display height and display coordinates of the current component, filling the high resolution picture and other resource files into the current component, and displaying the current component;

drawing, by the client, the current component according to the low resolution picture, the display width, display height and display coordinates of the current component specifically comprises:

taking, by the client, the left top corner of the current module as the coordinate origin, locating the current component according to the display width, display height and display coordinates of the current component, filling the low resolution picture in the current component, and displaying the current component; and drawing, by the client, the current component according to the display width, display height and display coordinates of the current component and the low resolution picture and other resource file specifically comprises:

taking, by the client, the left top corner of the current module as the coordinate origin, locating the current component according to the display width, display height and display coordinates of the current component, filling the low resolution picture and other resource files in the current component, and displaying the current component.

8. A method for screen adaption, comprising the following steps:
- E1) obtaining, by the client, a UI data packet/package, parsing the UI data packet, obtaining drawing information of a global module and drawing information of respective components, the global module comprises all components in said UI;
- E2) determining, by the client, screen orientation of a device on which the client itself is, in the case of the screen orientation is portrait screen, executing step E3; in the case of the screen orientation is landscape screen, executing step E4;
- E3) setting, by the client, display width of the global module to be screen width of the device, obtaining display height of the global module according to display width of the global module and drawing information of the global module, executing Step E5;
- E4) setting, by the client, the display height of the global module to be screen width of the device, obtaining the display width of the global module according to the display height of the global module and the drawing information of the global module, executing Step E5;
- E5) obtaining display width, display height and display coordinates of the respective components according to the display width of the global module, the display height of the global module, the drawing information of respective components; drawing the respective components according to the display width, display height and display coordinates of the respective components and resource files required to be filled in the respective components, and executing Step E6;
- E6) monitoring, by the client, the screen orientation of the device, going back to Step E2 when detecting that screen orientation of the device changes wherein the UI comprises a plurality of modules, the modules of the UI are arranged in vertical direction, each module contains one or a plurality of components; the portrait screen display information of the respective components comprises portrait screen display width, portrait screen display height and portrait screen display coordinates of the respective components, and the landscape screen display information of the respective components comprises landscape screen display width, landscape screen display height and landscape screen display coordinates of the respective components;

according to screen size of the device on which the client is, drawing information of the respective modules and drawing information of the respective components, obtaining, by the client, and storing portrait screen display information of the respective components specifically comprises:
- K1) selecting, by the client, a module on the top of the UI to be a current module, setting the portrait screen of the current module to be left top corner of device screen, storing portrait screen display coordinates of the current module, setting the portrait screen display width of the current module to be screen width of the device, and obtaining the portrait screen display height of the current module according to the drawing information and the portrait screen display width of the current module;
- K2) obtaining and storing, by the client, the portrait screen display width and portrait screen display height and portrait screen display coordinates of the respective components of the current module according to the portrait screen display width and portrait screen display height of the current module and drawing information of the respective components of the current module;
- K3) determining, by the client, whether the UI contains any unprocessed module, if yes, executing Step K4; otherwise, determining completion of obtaining portrait screen display information;
- K4) obtaining, by the client, an operation result by means of adding portrait screen display ordinate of the current module to portrait screen display height of the current module, and selecting a module in the UI, which is adjacent to the current module and located below the current module, as updated current module; and
- K5) setting, by the client, the portrait screen display ordinates of the current module as the operation result, setting the portrait screen display ordinate of the current module to be 0, setting the portrait screen display width of the current module to be screen width of the device, obtaining the portrait screen display height of the current module according to the drawing information and portrait screen display width of the current module, then going back to step K2;

according to screen size of the device on which the client is, drawing information of the respective modules and drawing information of the respective components, obtaining, by the client, and storing landscape screen display information of the respective components specifically comprises:
- L1) selecting, by the client, module on the top of the UI to be a current module, setting the landscape screen of the current module to be left top corner of device screen, storing landscape screen display coordinates of the current module, setting the landscape screen display width of the current module to be screen height of the device, obtaining the landscape screen display height of the current module according to the drawing information and landscape screen display width of the current module;

L2) obtaining and storing, by the client, the landscape screen display width, landscape screen display height and landscape screen display coordinates of the respective components of the current module according to the landscape screen display width, landscape screen display height of the current module and the drawing information of the respective components of the current module;

L3) determining, by the client, whether the UI contains any unprocessed module, if yes, executing Step L4; otherwise, determining completion of obtaining the landscape screen display information;

L4) obtaining, by the client, an operation result by means of adding the display ordinate of the current module to the landscape screen display height of the current module, and selecting a module in the UI, which is adjacent to the current module and located below the current module, as the updated current module; and L5) setting, by the client, the landscape screen display ordinates of the current module as the operation result, setting the landscape screen display ordinate of the current module to be 0, setting the landscape screen display width of the current module to be screen width of the device, obtaining the landscape screen display height of the current module according to the drawing information and landscape screen display width of the current module, then going back to step L2.

9. The method of claim 8, wherein after the client determines that the screen orientation is portrait screen, the method further comprises:

determining, by the client, a width-height aspect ratio of the global module according to drawing information of the global module;

in the case of the width-height aspect ratio of the global module is less than screen width-height aspect ratio of the device, setting, by the client, the display height of the global module to be screen height of the device, obtaining the display width of the global module according to the display height of the global module and the drawing information of the global module, obtaining the display width of the global module, executing Step E5;

in the case of the width-height aspect ratio of the global module is equal to the width-height ratio of the device, setting, by the client, the display height of the global module to be the screen height of the device, setting the display width of the global module to be the screen width of the device, executing Step E5; and in the case of the width-height aspect ratio of the global module is greater than the screen width-height aspect ratio of the device, executing Step E3.

10. The method of claim 8, wherein after determining, by the client, that the screen orientation is landscape screen, the method further comprises:

according to the drawing information of the global module, determining, by the client, the width-height aspect ratio of the global module, in the case of the width-height aspect ratio of the global module is less than the screen height-width aspect ratio of the device, executing Step E4;

in the case of the width-height ratio of the global module is equal to the screen height-width ratio of the global module of the device, setting, by the client, the display height of the global module to be screen width of the device, setting the display width of the global module to be screen height of the device, executing Step E5; and in the case of the width-height ratio of global module is greater than the screen height-width ratio of the device, setting the display width of the global module to be the screen height of the device, obtaining the display height of the global module according to the display width of the global module and the drawing information of the global module, executing Step E5.

11. The method of claim 8, wherein the step E5 specifically comprises:

F1) selecting, by the client, one component not yet being drawn from the global module to be a current component, obtaining the display width, display height and display coordinates of the current component according to the display width, display height and drawing information of the current component of the global module;

F2) according to the display width, display height and display coordinates of the current component and the resource file required to be filled in the current component, drawing, by the client, the current component; and F3) determining, by the client, whether the global module contains any component not being drawn, if yes, going back to Step F1; otherwise, executing Step E6.

12. A method for screen adaption comprising following steps:

H1) obtaining, by a client, UI data packet/package from a server, parsing the UI data packet, obtaining drawing information of respective modules and drawing information of respective components, H2) according to screen size of a device on which the client itself is, drawing information of the respective modules and drawing information of the respective components, obtaining, by the client, portrait screen display information and landscape screen display information of the respective components;

H3) determining, by the client, screen orientation of a device on which the client itself is, in the case of the screen orientation is portrait screen, executing step H4; in the case of the screen orientation is landscape screen, executing step H5;

H4) drawing, by the client, the respective components according to the portrait screen display information of the respective components and executing step H6;

H5) drawing, by the client, the respective components according to the landscape screen display information of the respective components and executing step H6;

H6) monitoring, by the client, screen orientation of the device, going back to step H7 when detecting that screen orientation of the device changes;

H7) determining, by the client, the screen orientation of the device on which the client itself is, in the case of the screen orientation is portrait screen, executing Step H8; in the case of the screen orientation is landscape screen, executing step H9;

H8) drawing, by the client, the respective components according to the portrait screen display information of the respective components, executing step H6; and H9) drawing, by the client, the respective components according to the landscape screen display information of the respective components, executing step H6 wherein the UI comprises a plurality of modules, the modules of the UI are arranged in vertical direction, each module contains one or a plurality of components; the portrait screen display information of the respective components comprises portrait screen display width, portrait screen display height and portrait screen display coordinates of the respective components, and the landscape screen display information of the respective components comprises landscape screen display width, landscape screen display height and landscape screen display coordinates of the respective components;

according to screen size of the device on which the client is, drawing information of the respective modules and drawing information of the respective components, obtaining, by the client, and storing portrait screen display information of the respective components specifically comprises:

K1) selecting, by the client, a module on the top of the UI to be a current module, setting the portrait screen of the current module to be left top corner of device screen, storing portrait screen display coordinates of the current module, setting the portrait screen display width of the current module to be screen width of the device, and obtaining the portrait screen display height of the current module according to the drawing information and the portrait screen display width of the current module;

K2) obtaining and storing, by the client, the portrait screen display width and portrait screen display height and portrait screen display coordinates of the respective components of the current module according to the portrait screen display width and portrait screen display height of the current module and drawing information of the respective components of the current module;

K3) determining, by the client, whether the UI contains any unprocessed module, if yes, executing Step K4; otherwise, determining completion of obtaining portrait screen display information;

K4) obtaining, by the client, an operation result by means of adding portrait screen display ordinate of the current module to portrait screen display height of the current module, and selecting a module in the UI, which is adjacent to the current module and located below the current module, as updated current module; and K5) setting, by the client, the portrait screen display ordinates of the current module as the operation result, setting the portrait screen display ordinate of the current module to be 0, setting the portrait screen display width of the current module to be screen width of the device, obtaining the portrait screen display height of the current module according to the drawing information and portrait screen display width of the current module, then going back to step K2;

according to screen size of the device on which the client is, drawing information of the respective modules and drawing information of the respective components, obtaining, by the client, and storing landscape screen display information of the respective components specifically comprises:

L1) selecting, by the client, module on the top of the UI to be a current module, setting the landscape screen of the current module to be left top corner of device screen, storing landscape screen display coordinates of the current module, setting the landscape screen display width of the current module to be screen height of the device, obtaining the landscape screen display height of the current module according to the drawing information and landscape screen display width of the current module;

L2) obtaining and storing, by the client, the landscape screen display width, landscape screen display height and landscape screen display coordinates of the respective components of the current module according to the landscape screen display width, landscape screen display height of the current module and the drawing information of the respective components of the current module;

L3) determining, by the client, whether the UI contains any unprocessed module, if yes, executing Step L4; otherwise, determining completion of obtaining the landscape screen display information;

L4) obtaining, by the client, an operation result by means of adding the display ordinate of the current module to the landscape screen display height of the current module, and selecting a module in the UI, which is adjacent to the current module and located below the current module, as the updated current module; and L5) setting, by the client, the landscape screen display ordinates of the current module as the operation result, setting the landscape screen display ordinate of the current module to be 0, setting the landscape screen display width of the current module to be screen width of the device, obtaining the landscape screen display height of the current module according to the drawing information and landscape screen display width of the current module, then going back to step L2.

13. The method of claim 12, wherein Step H6 further comprises:

monitoring, by the client, component attribution information of the respective components, and storing changed component attribution information when monitoring that the component attribution information is changed;

Step H8 specifically comprises: drawing, by the client, the respective components according to the portrait screen display information of the respective components, determining whether the component attribution information stored by the client itself exists, if yes, modifying attribution of a corresponding component according to the component attribution, deleting the component attribution information and going back to Step H6; otherwise, going back to Step H6; and Step H9 specifically comprises: drawing, by the client, the respective components according to landscape screen display information of the respective components, determining whether the component attribution information stored by the client itself exists, if yes, modifying attribution of a corresponding component according to the component attribution information, determining the component attribution information and going back to Step H6; otherwise, going back to Step H6.

14. The method of claim 12, wherein the drawing information of the current module is width-height aspect ratio or height-width aspect ratio of the current module;

obtaining, by the client, the portrait screen display height of the current module according to the drawing information and portrait screen display width of the current module specifically comprises:

performing, by the client, operation of dividing the portrait screen display width of the current module by the width-height aspect ratio of the current module, so as to obtain the portrait screen display height of the current module; or performing, by the client, operation of multiplying the portrait screen display width of the current module by the height-width aspect ratio of the current module, so as to obtain the portrait screen display height of the current module; and obtaining, by the client, the landscape screen display height of the current module according to the drawing information and landscape screen display width of the current module specifically comprises:

performing, by the client, operation of dividing the landscape screen display width of the current module by the width-height aspect ratio of the current module, so as to obtain the landscape screen display height of the current module; or performing, by the client, operation of multiplying the landscape screen display width of the current module by the height-width aspect ratio of the current module, so as to obtain the landscape screen display height of the current module.

15. The method of claim 12, wherein the drawing information of the current component comprises relative coordinates, relative width and relative height of the respective components; the relative coordinates of the respective components comprise relative ordinates and relative abscissas of the respective components; the portrait screen display coordinates of the current component are coordinates of the left top corners of the respective components by taking the left top corner of the current module origin of the coordinates; the portrait screen display coordinates of the current module comprise the portrait screen display ordinates and portrait screen display abscissas of the respective modules; and the landscape screen display coordinates of the current module comprise the landscape screen display ordinates and landscape screen display abscissas of the respective modules;

according to the portrait screen display width, portrait screen display height of the current module and the drawing information of the respective components of the current module, obtaining, by the client, and the portrait screen display width, portrait screen display height and portrait screen display coordinates of the respective components of the current module specifically comprises:

performing, by the client, operation of multiplying the portrait screen display width of the current module by the relative width of the respective components of the current module respectively, so as to obtain the portrait screen display width of the respective components of the current module; performing operation of multiplying the portrait screen display height of the current module by the relative height of the respective components of the current module, so as to obtain the portrait screen display height of the respective components of the current module; performing operation of multiplying the portrait screen display width of the current module by the relative ordinates of the respective components of the current module, so as to obtain the portrait screen display ordinates of the respective components of the current module; and performing operation of multiplying the portrait screen display height of the current module by the relative ordinates of the respective components of the current module, so as to obtain the portrait screen display ordinates of the respective components; and according to the landscape screen display width, landscape screen display height of the current module and the drawing information of the respective components of the current module, obtaining, by the client, and the landscape screen display width, landscape screen display height and landscape screen display coordinates of the respective components of the current module specifically comprises:

performing, by the client, operation of multiplying the landscape screen display width of the current module by the relative width of the respective components of the current module respectively, so as to obtain the landscape screen display width of the respective components of the current module; performing operation of multiplying the landscape screen display height of the current module by the relative height of the respective components of the current module, so as to obtain the landscape screen display height of the respective components of the current module; performing operation of multiplying the landscape screen display width of the current module by the relative ordinates of the respective components of the current module, so as to obtain the landscape screen display ordinates of the respective components of the current module; and performing operation of multiplying the landscape screen display height of the current module by the relative ordinates of the respective components of the current module, so as to obtain the landscape screen display ordinates of the respective components.

16. The method of claim 12, wherein after Step H1, the method further comprises:

obtaining, by the client, and storing the portrait screen display coordinates and the landscape screen display coordinates of the respective module according to the screen size of the device on which the client is and the drawing information of the respective modules, drawing, by the client, the respective components according to the portrait screen display information of the respective components specifically comprises:

M1) taking, by the client, one unprocessed module from the UI to be the current module, and selecting a component, which is not drawn, from the current module to be the current component;

M2) determining, by the client, whether filling a picture in the current component is required, if yes, executing Step M4; otherwise, executing Step M3;

M3) obtaining, by the client, a resource file required to be filled in the current component according to the content of the current component, drawing the current component according to the resource file, the portrait screen display coordinates of the current module, the portrait screen display width, portrait screen display height and portrait screen display coordinates of the current component, then executing Step M11;

M4) determining, by the client, whether screen density of the device is greater than a preset density value, if yes, executing Step M5; otherwise, executing Step M8;

M5) obtaining, by the client, a corresponding high resolution picture according to the content of the current component, determining whether other resource files except for the picture are required to be filled in the current component, if yes, executing Step M7; otherwise, executing Step M6;

M6) drawing, by the client, the current component according to the high resolution picture, the portrait screen display coordinates of the current module and the portrait screen display width, portrait screen display height and portrait screen display coordinates of the current component, then executing Step M11;

M7) obtaining, by the client, other resource files according to the content of the current component, drawing the current component according to the portrait screen display coordinates of the current module, the portrait screen display width, portrait screen display height and portrait screen display coordinates of the current component, the high resolution picture and other resource files; then executing Step M11;

M8) obtaining, by the client, a corresponding low resolution picture according to the content of the current component, determining whether other resource files except for the picture are required to be filled in the current component, if yes, executing Step M10; otherwise, executing Step M9;

M9) drawing, by the client, the current component according to the low resolution picture, the portrait screen display coordinates of the current module and the portrait screen display width, portrait screen display height and portrait screen display coordinates of the current component, then executing Step M11;

M10) obtaining, by the client, other resource files except for the picture according to the content of the current component, drawing the current component according to the portrait screen display coordinates of the current module, the portrait screen display width, portrait screen display height and portrait screen display coordinates of the current component, the low resolution picture and other resource files; then executing Step M11;

M11) determining, by the client, whether the current module contains any component which has not yet been drawn, if yes, selecting a component which is not drawn from the current module to be current component, going back to Step M2; otherwise, executing Step M12; and M12) determining, by the client, whether the UI contains any unprocessed module, if yes, going back to M1; otherwise, determining completion of drawing the component;

drawing, by the client, the respective components according to the landscape screen display information of the respective components specifically comprises:

N1) selecting, by the client, one unprocessed module from the UI to be the current module, and selecting a component which is not drawn from the current module to be the current component;

N2) determining, by the client, whether filling a picture in the current component is required, if yes, executing Step N4; otherwise, executing Step N3;

N3) obtaining, by the client, a resource file required to be filled in the current component according to the content of the current component, and drawing the current component according to the resource file, the landscape screen display coordinates of the current module, the landscape screen display width, landscape screen display height and landscape screen display coordinates of the current component, then executing Step N11;

N4) determining, by the client, whether the screen density of the device is greater than the preset density value, if yes, executing step N5; otherwise, executing Step N8;

N5) obtaining, by the client, a corresponding high resolution picture according to the content of the current component, and determining whether other resource files except for the picture are required to fill in the current component, if yes, executing Step N7; otherwise, executing Step N6;

N6) drawing, by the client, the current component according to the high resolution picture, the landscape screen display coordinates of the current module and the landscape screen display width, landscape screen display height and landscape screen display coordinates of the current component, then executing Step N11;

N7) obtaining, by the client, other resource files except for the picture according to the content of the current component, and drawing the current component according to the landscape screen display coordinates of the current module, the landscape screen display width, landscape screen display height and landscape screen display coordinates of the current component, the high resolution picture and other resource files; executing Step N11;

N8) obtaining, by the client, a corresponding low resolution picture according to the content of the current component, and determining whether other resource files except for the picture are required to be filled in the current component, if yes, executing Step N10; otherwise, executing Step N9;

N9) drawing, by the client, the current component according to the low resolution picture, the landscape screen display coordinates of the current module and the landscape screen display width, landscape screen display height and landscape screen display coordinates of the current component, then executing Step N11;

N10) obtaining, by the client, other resource files except for the picture according to the content of the current component, and drawing the current component according to the landscape screen display coordinates of the current module, the landscape screen display width, landscape screen display height and landscape screen display coordinates of the current component, the low resolution picture and other resource files; then executing Step N11;

N11) determining, by the client, whether the current module contains the component which has not yet been drawn, if yes, selecting a component which is not drawn from the current module to be the current component, going back to step N2; otherwise executing Step N12; and N12) determining, by the client, whether the UI contains any unprocessed module, if yes, going back to step N1; otherwise, determining completion of drawing component.

17. The method of claim 16, wherein drawing, by the client, the current component according to the resource file, the portrait screen display coordinates of the current module and the portrait screen display width, portrait screen display height and portrait screen display coordinates of the current component specifically comprises:

determining, by the client, position of the left top corner of the current module according to the portrait screen display coordinates of the current module, taking the left top corner of the current module as coordinate origin, locating the current component according to the portrait screen display width, portrait screen display height and portrait screen display coordinates of the current component, filling the resource file in the current component, and displaying the current component;

drawing, by the client, the current component according to the high resolution picture, the portrait screen display coordinates of the current module and the portrait screen display width, portrait screen display height and portrait screen display coordinates of the current component specifically comprises:

determining, by the client, the position of the left top corner of the current module according to the portrait screen coordinates of the current module, taking the left top corner of the current module as coordinate origin; locating the current component according to the portrait screen display width, portrait screen display height and portrait screen display coordinates of the current component, filling the high resolution picture in the current component, and displaying the current component;

drawing, by the client, the current component according to the portrait screen display coordinates of the current module, the portrait screen display width, portrait screen display height and portrait screen display coordinates of the current component, the high resolution picture and other resource files specifically comprises:

determining, by the client, the position of the left top corner of the current module according to the portrait screen display coordinates of the current module, taking the left top corner of the current module as coordinate origin, and locating the current component according to the portrait screen display width, portrait screen display height and portrait screen display coordinates of the current component, filling the high resolution picture and other resource files in the current component, and displaying the current component;

drawing, by the client, the current component according to the low resolution picture, the portrait screen display coordinates of the current module and the portrait screen display width, portrait screen display height and portrait screen display coordinates of the current component specifically comprises:

determining, by the client, the position of the left top corner of the current module according to the portrait screen display coordinates of the current module, taking the left top corner of the current module as coordinate origin, and locating the current component according to the portrait screen display width, portrait screen display height and portrait screen display coordinates of the current component, filling the low resolution picture in the current component, and displaying the current component;

drawing, by the client, the current component according to the low resolution picture, the portrait screen display coordinates of the current module and the portrait screen display width, portrait screen display height and portrait screen display coordinates of the current component, the low resolution picture and other resource files specifically comprises:

determining, by the client, the position of the left top corner of the current module according to the portrait screen display coordinates of the current module, taking the left top corner of the current module as coordinate origin, and locating the current component according to the portrait screen display width, portrait screen display height and portrait screen display coordinates of the current component, filling the low resolution picture and other resource files in the current component, and displaying the current component;

drawing, by the client, the current component according to the resource file, the landscape screen display coordinates of the current module, the landscape screen display width, landscape screen display height and landscape screen display coordinates of the current component specifically comprises:

determining, by the client, position of the left top corner of the current module according to the landscape screen display coordinates of the current module, taking the left top corner of the current module as coordinate origin, and locating the current component according to the landscape screen display width, landscape screen display height and landscape screen display coordinates of the current component, filling the resource file in the current component, and displaying the current component;

drawing, by the client, the current component according to the high resolution picture, the landscape screen display coordinates of the current module and the landscape screen display width, landscape screen display height and landscape screen display coordinates of the current component specifically comprises:

determining, by the client, position of the left top corner of the current module according to the landscape screen display coordinates of the current module, taking the left top corner of the current module as coordinate origin, and locating the current component according to the landscape screen display width, landscape screen display height and landscape screen display coordinates of the current component, filling the high resolution picture in the current component, and displaying the current component;

drawing the current component according to the landscape screen display coordinates of the current module, the landscape screen display width, landscape screen display height and landscape screen display coordinates of the current component, the high resolution picture and other resource files specifically comprises:

determining, by the client, the position of the left top corner of the current module according to the landscape screen display coordinates of the current module, taking the left top corner of the current module as coordinate origin, and locating the current component according to the landscape screen display width, landscape screen display height and landscape screen display coordinates of the current component, filling the high resolution picture and other resource files in the current component, and displaying the current component;

drawing, by the client, the current component according to the low resolution picture, the landscape screen display coordinates of the current module and the landscape screen display width, landscape screen display height and landscape screen display coordinates of the current component specifically comprises:

determining, by the client, position of the left top corner of the current module according to the landscape screen display coordinates of the current module, taking the left top corner of the current module as coordinate origin, and locating the current component according to the landscape screen display width, landscape screen display height and landscape screen display coordinates of the current component, filling the low resolution picture in the current component, and displaying the current component; and drawing the current component according to the landscape screen display coordinates of the current module, the landscape screen display width, landscape screen display height and landscape screen display coordinates of the current component, the low resolution picture and other resource files specifically comprises:

determining, by the client, position of the left top corner of the current module according to the landscape screen display coordinates of the current module, taking the left top corner of the current module as coordinate origin, and locating the current component according to the landscape screen display width, landscape screen display height and landscape screen display coordinates of the current component, filling the low resolution picture and other resource files in the current component, and displaying the current component.

18. The method of claim 12, wherein the UI comprises a global module; the global module contains all components of the UI;

the portrait screen display coordinates of the respective components comprise the portrait screen display width, the portrait screen display height and portrait screen display coordinates of the respective components; the landscape screen display coordinates of the respective components comprise the landscape screen display width, landscape screen display height and landscape display coordinates of the respective components, according to screen size of a device on which the client is, drawing information of the respective modules and drawing information of the respective components, obtaining, by the client, portrait screen display information specifically comprises:

P1) determining, by the client, width-height aspect ratio of the global module according to the drawing information of the global module, in the case of the width-height aspect ratio of the global module is less than the screen width-height ratio of the device, executing Step P2; in the case of the width-height aspect ratio of the global module is equal to the screen width-height ratio of the device, executing Step P3; and in the case of the width-height aspect ratio of the global module is greater than the screen width-height ratio of the device, executing Step P4;

P2) setting, by the client, the portrait screen display height of the global module to be the screen height of the device, and obtaining the portrait screen display width of the global module according to the portrait screen display height of the global module and the drawing information of the global module, then executing Step P5;

P3) setting, by the client, the portrait screen display height of the global module to be the screen height of the device, setting the portrait screen display width of the global module to be the screen width of the device, then executing Step P5;

P4) setting, by the client, the portrait screen display width of the global module to be the screen width of the device, obtaining the portrait screen display height of the global module according to the portrait screen display width of the global module and the drawing information of the global module, then executing step P5; and P5) obtaining, by the client, the portrait display width, portrait display height and portrait display coordinates of the respective components according to the portrait screen display width of the global module, the portrait screen display height of the global module and the drawing information of the respective components;

according to screen size of the device on which the client is, drawing information of the respective modules and drawing information of the respective components, obtaining, by the client, and storing landscape screen display information of the respective components specifically comprises:

Q1) determining, by the client, the wide-height aspect ratio of the global module according to the drawing information of the global module, in the case of the wide-height aspect ratio of the global module is less than the screen height-width aspect ratio of the device, executing Step Q2; in the case of the wide-height aspect ratio of the global module is equal to the screen height-width aspect ratio of the device, executing Step Q3; and in the case of the wide-height aspect ratio of the global module is greater than the screen height-width aspect ratio of the device, executing Step Q4;

Q2) setting, by the client, the landscape screen display height of the global module as the screen width of the device, obtaining the landscape screen display width of the global module according to the landscape screen display height of the global module and the drawing information of the global module, then executing Step Q5;

Q3) setting, by the client, the landscape screen display height of the global module to be the screen width of the device, and setting the landscape screen display width of the global module to be screen height of the device, then executing Step Q5;

Q4) setting, by the client, the landscape screen display width of the global module to be the screen height of the device, and obtaining the landscape display height of the global module according to the landscape display width of the global module and the drawing information of the global module, then executing Step Q5; and Q5) obtaining, by the client, and storing the landscape display width, landscape display height and landscape display coordinates of the respective components according to the landscape screen display width of the global module, the landscape screen display height of the global module and the drawing information of the respective components.

19. The method of claim 18, wherein drawing the respective components according to the portrait screen display information of the respective components specifically comprises:

R1) selecting, by the client, one component, which has not yet been drawn, from the UI to be the current component;

R2) determining, by the client, whether filling the picture in the current component is required, if yes, executing Step R4; otherwise, executing Step R3;

R3) obtaining, by the client, the resource file required to be filled in the current component according to the content of the current component, and drawing the current component according to the resource file, the portrait screen display width, portrait screen display height and portrait screen display coordinates of the current component, then executing Step R11;

R4) determining, by the client, whether the screen density of the device is greater than a preset density value, if yes, executing Step R5; otherwise, executing Step R8;

R5) obtaining, by the client, a corresponding high resolution picture according to the content of the current component, and determining whether other resource files except for the picture are required to be filled in the current component, if yes, executing Step R7; otherwise, executing Step R6;

R6) drawing, by the client, the current component according to the high resolution picture, the portrait screen display width, portrait screen display height and portrait screen display coordinates of the current component, executing Step R11;

R7) obtaining, by the client, other resource files according to the content of the current component, and drawing the current component according to the portrait screen display width, portrait screen display height and portrait screen display coordinates of the current component, the high resolution picture and the other resource files, then executing Step R11;

R8) obtaining, by the client, a corresponding low resolution picture according to the content of the current component, and determining whether other resource files except for the picture are required to be filled in the current component, if yes, executing Step R10; otherwise, executing Step R9;

R9) drawing, by the client, the current component according to the low resolution picture, the portrait screen display width, portrait screen display height and portrait screen display coordinates of the current component, then executing Step R11;

R10) obtaining, by the client, other resource files except for the picture according to the content of the current component, and drawing the current component according to the portrait screen display width, portrait screen display height and portrait screen display coordinates of the current component, the low resolution picture and other resource files, then executing Step R11; and R11) determining, by the client, whether any UI contains the component which has not yet been drawn, if yes, going back to Step R1; otherwise, determining completion of drawing the component; and drawing, by the client, the respective component according to the landscape screen display information according to the respective components specifically comprises:

S1) taking, by the client, one component which has not yet been drawn from the UI to be the current component;

S2) determining, by the client, whether filling the picture in the current component is required, if yes, executing Step S4; otherwise, executing Step S3;

S3) obtaining, by the client, the resource file required to be filled in the current component according to the content of the current component, and drawing the current component according to the resource file, the landscape screen display width, landscape screen display height and landscape screen display coordinates of the current component, then executing Step 11;

S4) determining, by the client, whether the screen density of the device is greater than the preset density value, if yes, executing Step S5; otherwise, executing Step S8;

S5) obtaining, by the client, a corresponding high resolution picture according to the content of the current component, and determining whether other resource files except for the picture is required to be filled in the current component, if yes, executing Step S7; otherwise, executing Step S6;

S6) drawing, by the client, the current component according to the high resolution picture, the landscape screen display width, landscape screen display height and landscape screen display coordinates of the current component, then executing Step 11;

S7) obtaining, by the client, other resource files according to the content of the current component, and drawing the current component according to the landscape screen display width, landscape screen display height and landscape screen display coordinates of the current component, the high resolution picture and the other resource files, then executing Step 11;

S8) obtaining, by the client, a corresponding low resolution picture according to the content of the current component, and determining whether other resource files except for the picture are required to be filled in the current component, if yes, executing Step 10; otherwise, executing Step 9;

S9) drawing, by the client, the current component according to the low resolution picture, the landscape screen display width, landscape screen display height and landscape screen display coordinates of the current component, then executing Step S11;

S10) obtaining, by the client, other resource files except for the picture according to the content of the current component, and drawing the current component according to the landscape screen display width, landscape screen display height and landscape screen display coordinates of the current component, the low resolution picture and other resource files, then executing Step S11; and S11) determining, by the client, whether any UI contains the component which has not yet been drawn, if yes, going back to Step S1; otherwise, determining completion of drawing the component.

\* \* \* \* \*